(12) United States Patent
Motos et al.

(10) Patent No.: US 11,936,681 B2
(45) Date of Patent: Mar. 19, 2024

(54) METHODS, APPARATUS, AND ARTICLES OF MANUFACTURE TO SECURE COMMUNICATIONS AGAINST EARLY-DETECT-LATE-COMMIT ATTACKS

(71) Applicant: Texas Instruments Incorporated, Dallas, TX (US)

(72) Inventors: Tomas Motos, Hamar (NO); Espen Wium, Oslo (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 413 days.

(21) Appl. No.: 17/463,297

(22) Filed: Aug. 31, 2021

(65) Prior Publication Data
US 2023/0068613 A1 Mar. 2, 2023

(51) Int. Cl.
| | |
|---|---|
| *H04L 29/06* | (2006.01) |
| *H04B 1/04* | (2006.01) |
| *H04L 9/40* | (2022.01) |
| *H04L 25/02* | (2006.01) |
| *H04L 43/0864* | (2022.01) |

(52) U.S. Cl.
CPC ........... *H04L 63/1441* (2013.01); *H04B 1/04* (2013.01); *H04L 25/0202* (2013.01); *H04L 43/0864* (2013.01)

(58) Field of Classification Search
CPC ............. H04L 25/0202; H04L 63/0864; H04L 63/1441; H04B 1/04
See application file for complete search history.

(56) References Cited

U.S. PATENT DOCUMENTS

2016/0323246 A1* 11/2016 Zivkovic ............... H04W 12/06
2020/0287728 A1* 9/2020 Danev ................. H04W 12/122

OTHER PUBLICATIONS

Singh et al., "UWB with Pulse Reordering: Securing Ranging against Relay and Physical-Layer Attacks," NDSS Symposium, Feb. 24-27, 2019, pp. 1-16 (16 pages).
Wikipedia, "Bluetooth," Jun. 30, 2021, [online] available at: https://en.wikipedia.org/w/index.php?title=Bluetooth&oldid=1030600411 (37 pages).

(Continued)

*Primary Examiner* — Jeffrey C Pwu
*Assistant Examiner* — Thong P Truong
(74) *Attorney, Agent, or Firm* — Mandy Barsilai Fernandez; Frank D. Cimino

(57) ABSTRACT

An example apparatus includes target signal generator circuitry to generate a target signal having a first center frequency and a bandwidth. The example apparatus additionally includes companion signal generator circuitry to generate a companion signal having a second center frequency that is less than (a) the first center frequency adjusted by a first threshold and greater than (b) the first center frequency adjusted by a second threshold, the first threshold being a first multiple of the bandwidth, the second threshold being a second multiple of the bandwidth, the first multiple different than the second multiple. In some examples, the example apparatus includes adder circuitry to combine the target signal and the companion signal to form a composite signal. Additionally, the example apparatus includes transmitter circuitry to transmit the composite signal to a target device.

20 Claims, 11 Drawing Sheets

(56) References Cited

OTHER PUBLICATIONS

Wikipedia, "Bluetooth Low Energy," Jun. 30, 2021, [online] available at: https://en.wikipedia.org/w/index.php?title=Bluetooth_Low_Energy&oldid=1026621577 (17 pages).
Wikipedia, "Casual filter," Jun. 30, 2021, [online] available at: https://en.wikipedia.org/w/index.php?title=Causal_filter&oldid=815843173 (3 pages).
Wikipedia, "Communication protocol," Jun. 30, 2021, [online] available at: https://en.wikipedia.org/w/index.php?title=Communication_protocol&oldid=1030530833 (16 pages).
Wikipedia, "Electronic oscillator," Jun. 30, 2021, [online] available at: https://en.wikipedia.org/w/index.php?title=Electronic_oscillator&oldid=1022792899 (10 pages).
Wikipedia, "Eye pattern," Jun. 30, 2021, [online] available at: https://en.wikipedia.org/w/index.php?title=Eye_pattern&oldid=1029759350 (12 pages).
Wikipedia, "Frequency mixer," Jun. 30, 2021, [online] available at: https://en.wikipedia.org/w/index.php?title=Frequency_mixer&oldid=1030216941 (5 pages).
Wikipedia, "OSI model," Jun. 30, 2021, [online] available at: https://en.wikipedia.org/w/index.php?title=OSI_model&oldid=1029831247 (13 pages).
Wikipedia, "Physical layer," Jun. 30, 2021, [online] available at: https://en.wikipedia.org/w/index.php?title=Physical_layer&oldid=1028519304 (5 pages).
Wikipedia, "Power dividers and directional couplers," Jun. 30, 2021, [online] available at: https://en.wikipedia.org/w/index.php?title=Power_dividers_and_directional_couplers&oldid=1028441635 (21 pages).
Wikipedia, "Radio receiver," Jun. 30, 2021, [online] available at: https://en.wikipedia.org/w/index.php?title=Radio_receiver&oldid=1027813643 (43 pages).
Wikipedia, "Round-trip delay" Jun. 30, 2021, [online] available at: https://en.wikipedia.org/w/index.php?title=Round-trip_delay&oldid=1025805873 (2 pages).
Pini, "The Fundamentals of RF Power Dividers and Combiners," Digi-Key, [online] available at: https://www.digikey.com/en/articles/the-fundamentals-of-rf-power-dividers-and-combiners (8 pages).
Wikipedia, "Signal generator" Jun. 30, 2021, [online] available at: https://en.wikipedia.org/w/index.php?title=Signal_generator&oldid=1008298931 (6 pages).
Wikipedia, "Transmitter" Jun. 30, 2021, [online] available at: https://en.wikipedia.org/w/index.php?title=Transmitter&oldid=1021967223 (8 pages).
Wikipedia, "Ultra-wideband" Jun. 30, 2021, [online] available at: https://en.wikipedia.org/w/index.php?title=Ultra-wideband&oldid=1031024692 (9 pages).

\* cited by examiner

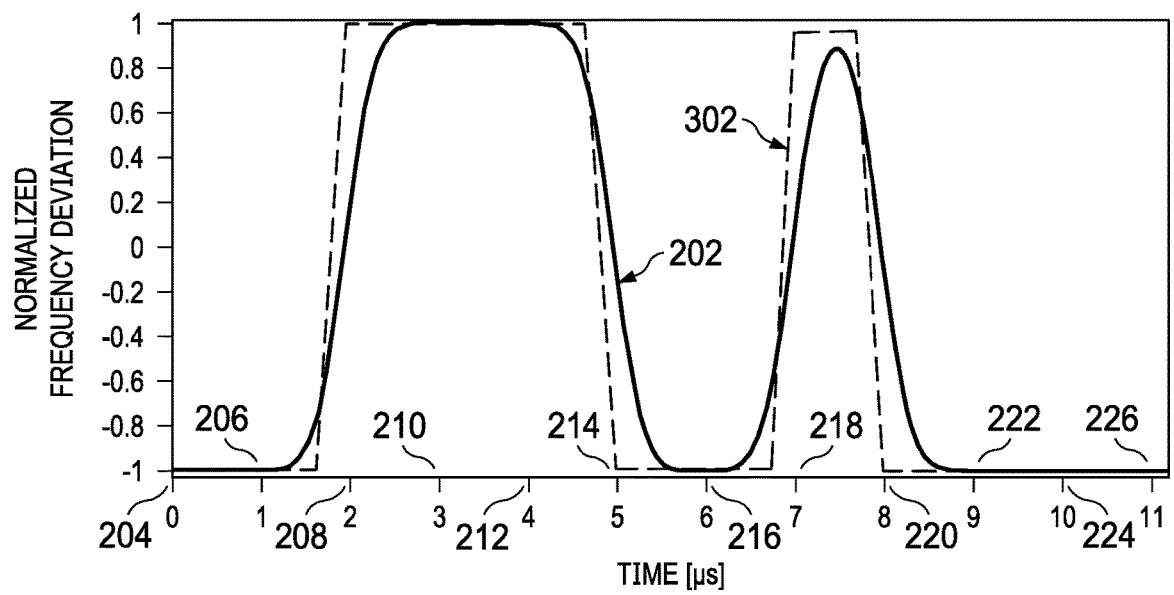
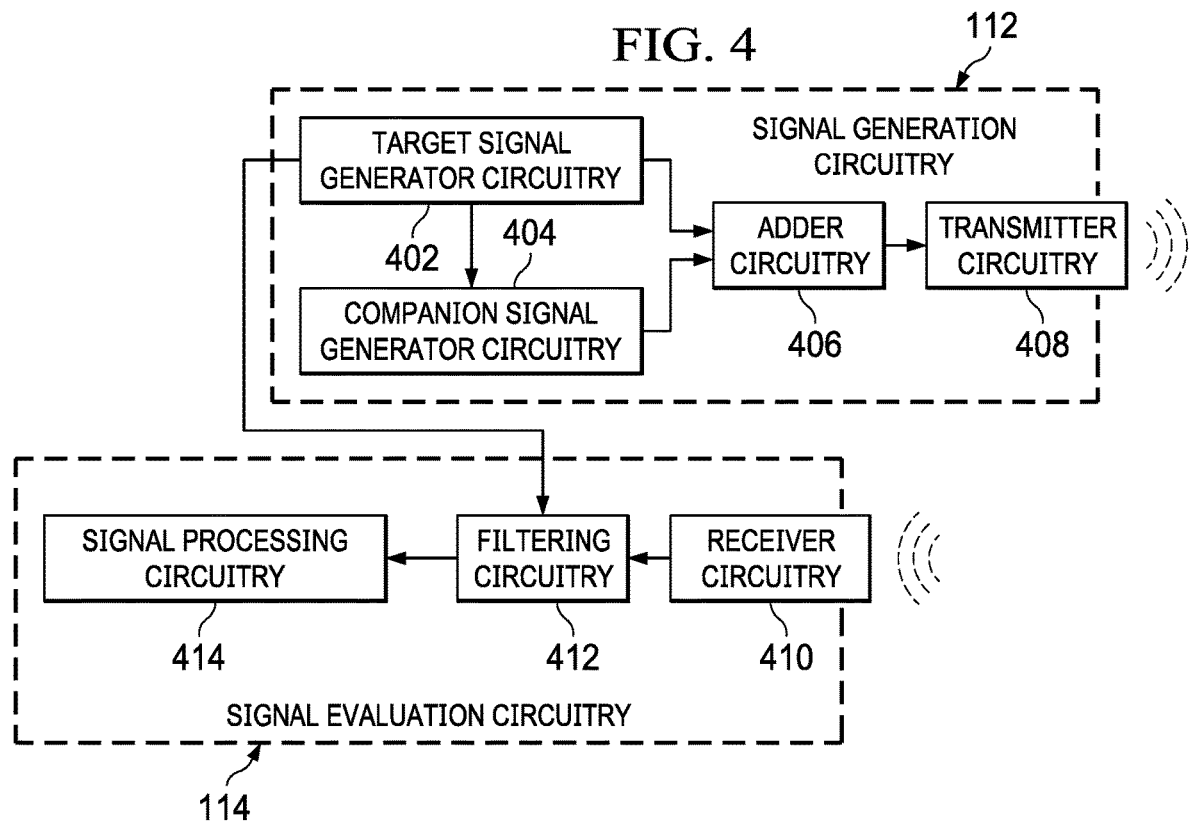

METHODS, APPARATUS, AND ARTICLES OF MANUFACTURE TO SECURE COMMUNICATIONS AGAINST EARLY-DETECT-LATE-COMMIT ATTACKS

TECHNICAL FIELD

This description relates generally to communication security and, more particularly, to methods, apparatus, and articles of manufacture to secure communications against early-detect-late-commit attacks.

BACKGROUND

The Open Systems Interconnection (OSI) model of a computing system separates data flow in the computing system into seven layers that are arranged in a hierarchy. The lowest level of the OSI model hierarchy is the physical layer which describes the physical means by which data is communicated via a communication medium. The highest level of the OSI model hierarchy is the application level which describes an application that is requesting to transmit data, available communication partners for the application, resource availability, and communication synchronization. In order from highest to lowest, the OSI model hierarchy includes: level one, the physical layer; level two, the data link layer; level three, the network layer; level four, the transport layer; level five, the session layer; level six, the presentation layer; and level seven, the application layer.

SUMMARY

For methods, apparatus, and articles of manufacture to secure communications against early-detect-late-commit attacks, an example apparatus includes target signal generator circuitry configured to generate a target signal having a first center frequency and a bandwidth. The example apparatus additionally or alternatively includes companion signal generator circuitry coupled to the target signal generator circuitry, the companion signal generator circuitry configured to generate a companion signal having a second center frequency that is less than (a) the first center frequency adjusted by a first threshold and greater than (b) the first center frequency adjusted by a second threshold, the first threshold being a first multiple of the bandwidth, the second threshold being a second multiple of the bandwidth, the first multiple different than the second multiple. In some examples, the example apparatus includes adder circuitry coupled to the target signal generator circuitry and the companion signal generator circuitry, the adder circuitry configured to combine the target signal and the companion signal to form a composite signal. Additionally or alternatively, the example apparatus includes transmitter circuitry coupled to the adder circuitry, the transmitter circuitry configured to transmit the composite signal to a target device

BRIEF DESCRIPTION OF THE DRAWINGS

FIG. 3 is a graphical illustration of the example target signal of FIG. 2 and an example early-detect-late-commit signal transmitted by the attack device of FIG. 1.

FIG. 4 is a schematic diagram illustrating an example implementation of the first signal generation circuitry and the first signal evaluation circuitry of FIG. 1.

DETAILED DESCRIPTION

Figure 1:
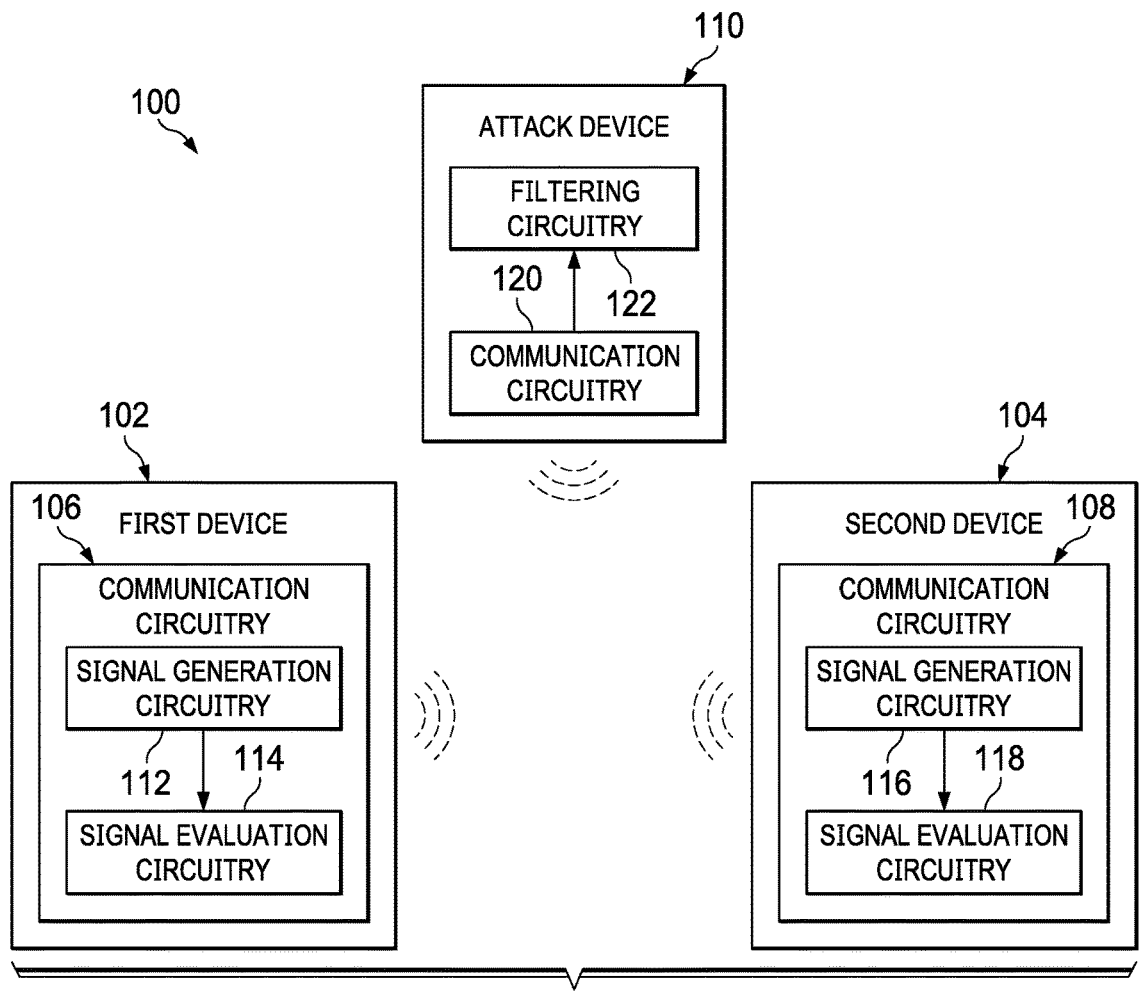
FIG. 1 is a schematic diagram of an example communication system including an example first device and an example second device.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately," "about," and "similar" refer to values that may not be exact due to real world imperfections in components (generating, operating on, measuring, etc.) that cause variations from an ideal value. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

In some examples, the OSI model is used to describe communication systems implementing technology such as ultra-wideband (UWB), Bluetooth, and Bluetooth Low Energy (LE), among others. Such communication systems may be implemented for proximity sensing, real-time location systems, personal security applications for prevention of theft and/or loss of devices, digital keys, radar, and data transfer, among others. In examples disclosed herein, a communication system includes an originating device that transmits information to a target device in the form of a target signal. As such, the originating device and the target device may be referred to as intended parties to one or more communications therebetween. In some examples, the originating device of one communication may be the target device of another communication. Likewise, in some examples, the target device of one communication may be the originating device of another communication. In some examples, the target device includes the originating device.

In some examples, a third device may transmit information to and/or receive information from the intended parties (e.g., the originating device and/or the target device) to a communication but nevertheless may be an unintended party to that communication. In some such examples, an unintended party may be operated by a malicious entity seeking to attack communications between the intended parties. As used herein, an attack device refers to a device operated by a malicious entity seeking to attack communications between an originating device and a target device. For example, communications between an originating device and a target device may be subjected to one or more malicious attacks by one or more attack devices (e.g., a local computer, a remote device, etc.) that result in at least interference between the originating device and the target device and/or an attack device obtaining information (e.g., in the form of data) that was intended to be secure. Additionally or alternatively, malicious attacks may result in vehicle theft, burglary, unauthorized payments, and navigation tampering, among others.

For example, one type of malicious attack is an Early-Detect-Late-Commit (EDLC) attack. An EDLC attack impacts communication between an originating device and/or a target device by affecting the physical layer of the originating device and/or the target device. In some examples, communications between the originating device and the target device are synchronized. To impact communication between an originating device and a target device, an EDLC attack device alters timing characteristics at which information (e.g., in the form of bits) is received by the intended parties. For example, an attack device may intend to mislead the originating device and/or the target device as to the propagation delay of a communication and/or to interfere with synchronization of the originating device and the target device by tampering with one or more measurements of Round Trip Time (RTT) by the originating device and/or the target device. As used herein, RTT refers to the amount of time that transpires between the transmission of a first signal by a first device and reception of a second signal by the first device, the second signal acknowledging that the first signal has been received. The RTT between two devices may be used to measure distance between the two devices. For example, in a Bluetooth LE communication system, a return time of 6.66 nanoseconds (ns) corresponds to a distance of one meter.

EDLC attacks include two phases: an Early Detect (ED) phase and a late-commit (LC) phase. During the ED phase, an attack device examines the content of a target signal (e.g., a bit sequence) being transmitted from an originating device (e.g., a first intended party) to a target device (e.g., a second intended party). For example, the attack device determines if, over a period of time, the communication is characteristic of a zero (e.g., 0) or a one (e.g., 1) in the bit sequence. During the LC phase, the attack device injects the determined bit sequences into a communication to the target device in a distorted fashion such that the target device interprets the communication (e.g., a radio frequency (RF) signal) as arriving at an earlier time as compared to the actual communication transmitted by the originating device.

In an example EDLC attack, the attack device is attempting to identify the contents (e.g., the bit sequence) of a target signal before the target device. For example, due to latency caused by filtering by the originating device, the rise time and/or fall time of a target signal (e.g., a communication) transmitted by the originating device are increased (e.g., the target signal rises and/or falls over a longer period of time). As such, during the ED phase of an EDLC attack, an attack device with sufficient computational and bandwidth resources may examine a target signal being transmitted to a target device within a short time (e.g., withing ns and/or before the target device may examine the target signal) to produce a bit sequence of the contents of the target signal. During the LC phase of such an EDLC attack, the attack device injects an "early" signal with the same bit sequence as the target signal but with a different time stamp.

EDLC attacks originated in the context of UWB radio technology as a way of facilitating distance-altering attacks. A distance-altering attack refers to an attack that alters the distance between two devices as perceived by one or more of the two devices. For example, two devices are, in reality, five meters apart. In such an example, if a communication indicating the real distance between the two devices (e.g., an RTT signal) suffers an effective EDLC attack, one or more of the two devices may perceive a distance therebetween that is different than five meters. For example, the EDLC attack device may cause one or more of the two devices to perceive that it is ten meters from the other of the two devices. In additional or alternative examples, the EDLC attack device may cause one or more of the two devices to perceive that it is one meter from the other of the two devices.

EDLC attacks are not limited to UWB radio technology. For example, EDLC attacks may also occur in narrowband radio technology such as Bluetooth. As described above, the typical RTT for one meter in a Bluetooth LE communication system is 6.66 ns. As such, if an EDLC attack can transmit an early signal to an originating device 66 ns earlier than the target device can acknowledge reception of the target signal, the EDLC attack device can cause the originating device to perceive the target device as ten meters closer than the target device actually is in reality. In some such examples, an attack device may intend to mislead the originating device and/or the target device as to the propagation delay of a communication and/or to interfere with synchronization of the intended parties by altering one or more measurements of RTT (e.g., a Round Trip Time measurement). By altering the time stamp of a target signal, the attack device may increase and/or decrease the result of a RTT measurement which may increase and/or decrease the perceived distance between two devices. As such, EDLC attacks pose hazards to safety and/or security including vehicle theft, burglary, unauthorized payments, and navigation tampering, among others.

Examples disclosed herein mitigate the chance of an effective EDLC attack. Examples disclosed herein include generating one or more companion signals to a target signal. The one or more companion signals have respective center frequencies that satisfy a narrowband threshold (discussed further herein) and satisfy a distortion threshold (discussed further herein). By implementing the narrowband threshold, examples disclosed herein advantageously ensures that companion signals are close enough in frequency to target signals to force attack devices to implement narrowband filtering circuitry to differentiate between the target signals and the companion signals. Additionally, an example advantage of disclosed examples is that reducing the bandwidth of the filtering circuitry increases the latency associated therewith and prevents attack devices from detecting the contents of target signals early enough to perform effective EDLC attacks. Additionally, by implementing the distortion threshold, examples disclosed herein advantageously ensure that companion signals are far enough in frequency from target signals to allow a target device to recover the target signal without errors.

FIG. 1 is a schematic diagram of an example communication system 100 including an example first device 102 and an example second device 104. In some examples, the first device 102 and the second device 104 are a similar type of device (e.g., a smart phone, a tablet, a vehicle, a computer, etc.). In other examples, the first device 102 and the second device 104 are a different type of device. In the example of FIG. 1, the first device 102 includes example first communication circuitry 106 and the second device 104 includes example second communication circuitry 108. In the example of FIG. 1, the first communication circuitry 106 and the second communication circuitry 108 implement Bluetooth communication circuitry to enable wireless Bluetooth communication between the first device 102 and the second device 104.

In the illustrated example of FIG. 1, the communication system 100 includes an example attack device 110 (e.g., a third device) that attempts to interfere with one or more communications between the first device 102 and the second device 104. For example, the attack device 110 attacks the one or more communications between the first device 102 and the second device 104 via one or more EDLC attacks. Advantageously, the example first communication circuitry 106 includes example first signal generation circuitry 112 to generate one or more target signals and one or more companion signals to reduce the possibility of an effective EDLC attack. In the example of FIG. 1, the first signal generation circuitry 112 includes a first output and a second output. Additionally, the example first communication circuitry 106 advantageously includes example first signal evaluation circuitry 114 to process one or more target signals and one or more companion signals received from the second device 104. In the example of FIG. 1, the first signal evaluation circuitry 114 includes a first input and a second input. Similarly, the example second communication circuitry 108 advantageously includes example second signal generation circuitry 116 to generate one or more target signals and one or more companion signals to reduce the possibility of an effective EDLC attack. In the example of FIG. 1, the second signal generation circuitry 116 includes a first output and a second output. Additionally, the example second communication circuitry 108 advantageously includes example second signal evaluation circuitry 118 to process one or more target signals and one or more companion signals received from the first device 102. In the example of FIG. 1, the second signal evaluation circuitry 118 includes a first input and a second input.

In the illustrated example of FIG. 1, the attack device 110 includes example third communication circuitry 120 and example filtering circuitry 122. In the example of FIG. 1, the third communication circuitry 120 is coupled to the filtering circuitry 122. In the example of FIG. 1, the third communication circuitry 120 implements high bandwidth communication circuitry to allow the attack device 110 to obtain an early detection of one or more target signals transmitted between the first device 102 and the second device 104. For example, the third communication circuitry 120 includes a bandwidth B Hertz (Hz). Typically, the bandwidth (e.g., B Hz) of the third communication circuitry 120 is the same and/or similar to the bandwidth of signals specified by the communication protocol that the attack device 110 seeks to attack. For example, if the attack device 110 seeks to attack the Bluetooth LE protocol, the bandwidth of the third communication circuitry 120 is the same or similar to 1.1 megahertz (MHz).

In the illustrated example of FIG. 1, to detect the contents (e.g., bit sequence) of the one or more target signals, the attack device 110 includes the filtering circuitry 122 to filter the contents from other signals detected by the third communication circuitry 120. For example, to accommodate the bandwidth (e.g., B Hz) of the third communication circuitry 120, the filtering circuitry 122 includes a latency that is proportional to the inverse of the bandwidth (e.g., 1/B seconds (s)). For example, for an EDLC attack on the Bluetooth LE protocol, the latency of the filtering circuitry 122 is proportional to 909.09 ns (e.g., 1/1.1 MHz) or approximately 910 ns. Generally, to ensure that the attack device 110 can detect the bit sequence of a target signal early enough to successfully complete an EDLC attack, the filtering circuitry 122 includes a latency that is the same or similar to the inverse of five times the bandwidth (e.g., 1/5B). To reduce the latency of the filtering circuitry 122 (e.g., 1/5B<1/B), the bandwidth of the filtering circuitry 122 may be increased (e.g., to 5B). The latency of the filtering circuitry 122 is an inherent characteristic of the filtering circuitry 122 that results from the causal nature of real world (e.g., non-idealized) filtering circuitry.

Figure 2:
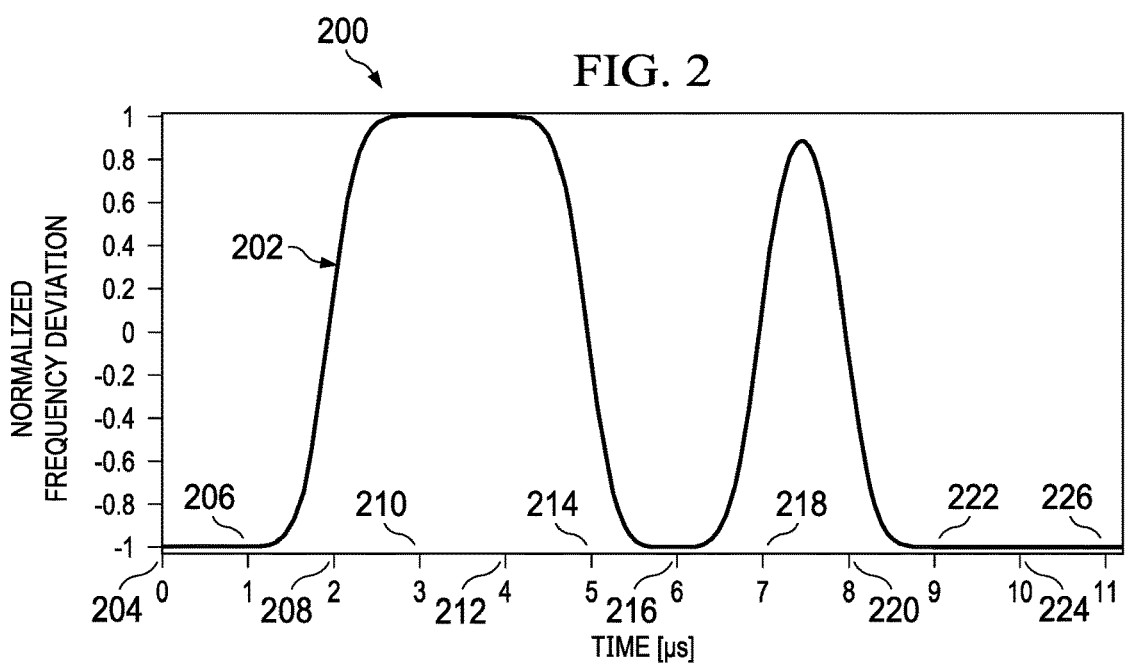
FIG. 2 is a graphical illustration of an example target signal transmitted by communication circuitry that does not implement example methods, apparatus, and articles of manufacture disclosed herein.

FIG. 2 is a graphical illustration 200 of an example target signal 202 transmitted by communication circuitry that does not implement example methods, apparatus, and articles of manufacture disclosed herein. In the example of FIG. 2, the target signal 202 is a Bluetooth LE signal that has been modulated with Gaussian Frequency Shift Keying (GFSK). In GFSK modulation, a zero (e.g., 0) bit is transmitted by causing a deviation of −250 kilohertz (KHz) and a one (e.g., 1) bit is transmitted by causing a deviation of 250 KHz. In the example of FIG. 2, a target device filters the target signal 202 via a Gaussian filter.

In the illustrated example of FIG. 2, the X-axis of the graphical illustration 200 corresponds to time and ranges from zero to eleven microsecond (µs) (e.g., 0-11 µs) in intervals of one µs. In the example of FIG. 2, the Y-axis of the graphical illustration 200 corresponds to normalized frequency deviation and ranges from negative one to one (e.g., −1-1) in intervals of 0.2. In the example of FIG. 2, the target signal 202 includes a bit sequence of [0 0 1 1 1 0 0 1 0 0 0] indicated by a zero bit transmitted between time 204 and time 206, a zero bit transmitted between time 206 and time 208, a one bit transmitted between time 208 and time 210, a one bit transmitted between time 210 and time 212, a one bit transmitted between time 212 and time 214, a zero bit transmitted between time 214 and time 216, a zero bit transmitted between time 216 and time 218, a one bit transmitted between time 218 and time 220, a zero bit transmitted between time 220 and time 222, a zero bit transmitted between time 222 and time 224, and a zero bit transmitted between time 224 and time 226.

In the illustrated example of FIG. 2, the originating device encodes each of the bits of the bit sequence into the target signal 202 by deviating the frequency of the target signal 202. For example, to encode a zero bit in the target signal 202, the originating device cause a frequency deviation of −250 KHz. Additionally or alternatively, to encode a one bit in the target signal 202, the originating device cause a frequency deviation of +250 KHz. The originating device filters each bit of the bit sequence in the target signal 202 via a Gaussian filter to reduce the bandwidth of the target signal 202 and improve coexistence between individual bits of the bit sequence. However, as described above, due to the filtering, transitions (e.g., rise time and/or fall time) between bits of the target signal 202 are increased (e.g., the target signal 202 rises and/or falls over a longer period of time). For example, an idealized transition between the zero bit transmitted between time 206 and time 208 and the one bit transmitted between time 208 and time 210 would take place at exactly time 208. However, due to the latency caused by filtering, the transition between the zero bit and the one bit begins about halfway between time 206 and time 208 (e.g., at about 1.5 µs).

Accordingly, because the target signal 202 was transmitted by communication circuitry that does not implement example methods, apparatus, and articles of manufacture disclosed herein, the attack device 110 and/or any other attack device including sufficient computational and bandwidth resources and high signal to noise ratio (SNR) is capable of identifying that the bit transmitted between time 208 and time 210 is a one bit before time 208 occurs. As such, the attack device 110 may conduct an EDLC attack on the target signal 202.

FIG. 3 is a graphical illustration 300 of the example target signal 202 of FIG. 2 and an example EDLC signal 302 transmitted by the attack device 110 of FIG. 1. As described above, the target signal 202 is a Bluetooth LE signal and the typical RTT for one meter in a Bluetooth LE communication system is 6.66 ns. As illustrated in FIG. 3, the duration of a bit (e.g., 1 µs) of the target signal 202 is typically longer than the propagation delay involved in an RTT measurement for the target signal 202. As such, without examples disclosed herein, attack devices such as the attack device 110 are free to pursue EDLC attacks on the target signal 202.

Returning to FIG. 1, as described above, the filtering circuitry 122 of the attack device 110 generally includes a bandwidth that is much higher than the bandwidth of the target signal (e.g., 5B>>B) so that the filtering circuitry 122 may detect the bit sequence of a target signal early enough to spoof the target signal to a target device. As such, the filtering circuitry 122 implements wideband filtering. As described above, the first communication circuitry 106 includes the first signal generation circuitry 112. For example, the first signal generation circuitry 112 is implemented by one or more special purpose electrical circuits structured to perform specific operation(s) and including one or more semiconductor-based logic devices (e.g., electrical hardware implemented by one or more transistors). In additional or alternative examples, the first signal generation circuitry 112 may be implemented by transmitter circuitry, receiver circuitry, transceiver circuitry, one or more microprocessors programmed with instructions to perform specific operations, one or more Field Programmable Gate Arrays (FPGAs) that may instantiate instructions to perform specific operations, one or more Central Processor Units (CPUs) programmed with instructions to perform specific operations, one or more Graphics Processing Units (GPUs) programmed with instructions to perform specific operations, one or more Digital Signal Processors (DSPs) programmed with instructions to perform specific operations, one or more XPUs programmed with instructions to perform specific operations, one or more microcontrollers programmed with instructions to perform specific operations, and/or one or more integrated circuits such as one or more Application Specific Integrated Circuits (ASICs). In some examples, the first signal generation circuitry 112 may implemented in one or more packages, as part of a System on a Chip (SoC), and/or on one or more substrates. In the example of FIG. 1, the first output of the first signal generation circuitry 112 is coupled to the first input of the first signal evaluation circuitry 114. In the example of FIG. 1, the second output of the first signal generation circuitry 112 is an RF output.

As described above, the first signal generation circuitry 112 generates one or more target signals and one or more companion signals to reduce the possibility of an effective EDLC attack. As used herein, a companion signal refers to a signal having a similar amplitude as a target signal but shifted in frequency. For example, a companion signal has similar power to an associated target signal. Example companion signals disclosed herein may include randomly generated data having no meaning and/or organized data having meaning. Accordingly, examples disclosed herein impose no restrictions on the data content of companion signals. As such, in some examples, a companion signal is another RTT measurement signal transmitted to a receiver (e.g., the second communication circuitry 108) of a target device. In additional or alternative examples, a companion signal includes data transfer between the originating device and a target device.

In the illustrated example of FIG. 1, the first signal generation circuitry 112 generates one or more companion signals that have respective center frequencies that satisfy a narrowband threshold and satisfy a distortion threshold. As used herein, the narrowband threshold refers to a frequency value that is approximately a multiple of the bandwidth of the target signal (e.g., $NB_{th}=5B$, $NB_{th}=6B$, $NB_{th}=4.5B$, etc.). In the example of FIG. 1, the narrowband threshold is a frequency value that is approximately five times the bandwidth of the target signal. As used herein, the distortion threshold refers to a frequency value that is approximately a multiple of the bandwidth of the target signal (e.g., $Dist_{th}=B$, $Dist_{th}=1.5B$, $Dist_{th}=0.5B$, etc.). In the example of FIG. 1, the distortion threshold is a frequency value that is approximately one times the bandwidth of the target signal. For example, to satisfy the narrowband threshold and the distortion threshold, the first signal generation circuitry 112 generates one or more companion signals that have respective center frequencies that are shifted from the center frequency of the target signal by less than five times the bandwidth of the target signal but more than one times the bandwidth of the target signal. As such, for an RF signal having a bandwidth of B Hz, the first signal generation circuitry 112 shifts the center frequencies of companion signals by more than B Hz from the center frequency of a target signal but less than 5B Hz from the center frequency of the target signal. For example, if the target signal is a Bluetooth LE signal, the first signal generation circuitry 112 generates one or more companion signals having respective center frequencies between approximately +/−1.1 MHz and +/−5.5 MHz. Generally, for a given communication protocol with an RF signal having a bandwidth of B Hz, an effective companion signal may have a center frequency 2B Hz from the center frequency of the target signal. As such, the difference between the center frequency of the target signal and the center frequency of the companion signal is approximately the absolute value of two times the bandwidth (e.g., 2B Hz).

In the illustrated example of FIG. 1, by implementing the narrowband threshold, the first signal generation circuitry 112 advantageously ensures that companion signals are close enough in frequency to target signals to force the attack device 110 to implement narrowband filtering circuitry to differentiate between the target signals and the companion signals. However, reducing the bandwidth of the filtering circuitry increases the latency associated therewith which prevents the attack device 110 from detecting the contents of target signals early enough to perform effective EDLC attacks. For example, even if the attack device 110 includes infinite computing capability, the attack device 110 would still be unable to perform an effective EDLC attack without implementing narrowband filtering. Yet, the attack device 110 cannot perform effective EDLC attacks with narrowband filtering because only wideband filtering allows the attack device 110 to perform an EDLC attack early enough (e.g., due to the inherent latency of the filtering) to be feasible. Additionally, by implementing the distortion threshold, the first signal generation circuitry 112 advantageously ensures that companion signals are far enough in frequency from target signals to allow a target device to recover the target signal without errors.

In the illustrated example of FIG. 1, the first communication circuitry 106 includes the first signal evaluation circuitry 114. For example, the first signal evaluation circuitry 114 is implemented by one or more special purpose electrical circuits structured to perform specific operation(s) and including one or more semiconductor-based logic devices (e.g., electrical hardware implemented by one or more transistors). In additional or alternative examples, the first signal evaluation circuitry 114 may be implemented by transmitter circuitry, receiver circuitry, transceiver circuitry, one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the first signal evaluation circuitry 114 may implemented in one or more packages, as part of an SoC, and/or on one or more substrates. In the example of FIG. 1, the first input of the first signal evaluation circuitry 114 is coupled to the first output of the first signal generation circuitry 112. In the example of FIG. 1, the second input of the first signal evaluation circuitry 114 is an RF input.

As described above, the first signal evaluation circuitry 114 processes one or more target signals and one or more companion signals received from the second device 104. For example, the first signal evaluation circuitry 114 implements a narrowband filter having a center frequency at the center frequency (e.g., 0 Hz for Bluetooth LE signals) of signals specified by the communication protocol to which the target signal complies and a bandwidth no larger than the bandwidth (e.g., B Hz, 1.1 MHz for Bluetooth LE signals, etc.) of signals specified by the communication protocol to which the target signal complies. As such, the first signal evaluation circuitry 114 filters companion signals from target signals to properly identify a bit sequence of the target signals. In some examples, the first signal evaluation circuitry 114 may be prefabricated according to a specific communication protocol (e.g., Bluetooth LE) and/or may be adjustable to accommodate many communication protocols.

In the illustrated example of FIG. 1, the second signal generation circuitry 116 is substantially similar to the first signal generation circuitry 112. Additionally, the second signal evaluation circuitry 118 is substantially similar to the first signal evaluation circuitry 114. As such, for purposes of clarity, the second signal generation circuitry 116 will not be discussed further herein except for when the description of the second signal generation circuitry 116 differs from the description of the first signal generation circuitry 112. However, any of the description and/or illustration of solely the first signal generation circuitry 112 should be understood to similarly apply to the second signal generation circuitry 116.

Similarly, for purposes of clarity, the second signal evaluation circuitry 118 will not be discussed further herein except for when the description of the second signal evaluation circuitry 118 differs from the description of the first signal evaluation circuitry 114. However, any of the description and/or illustration of solely the first signal evaluation circuitry 114 should be understood to similarly apply to the second signal evaluation circuitry 118.

FIG. 4 is a schematic diagram illustrating an example implementation of the first signal generation circuitry 112 and the first signal evaluation circuitry 114 of FIG. 1. In the example of FIG. 4, the first signal generation circuitry 112 includes example target signal generator circuitry 402, example companion signal generator circuitry 404, example adder circuitry 406, and example transmitter circuitry 408. In the example of FIG. 4, the first signal evaluation circuitry 114 includes example receiver circuitry 410, example filtering circuitry 412, and example signal processing circuitry 414. In the example of FIG. 4, the target signal generator circuitry 402 includes a first output, a second output, and a third output. In the example of FIG. 4, the companion signal generator circuitry 404 includes a first output and a second output. In the example of FIG. 4, the adder circuitry 406 includes a first input, a second input, and an output. In the example of FIG. 4, the transmitter circuitry 408 includes an input and an RF output. In the example of FIG. 4, the receiver circuitry 410 includes an RF input and an output. In the example of FIG. 4, the filtering circuitry 412 includes a first input, a second input, and an output. In the example of FIG. 4, the signal processing circuitry 414 includes an input.

In the illustrated example of FIG. 4, the first output of the target signal generator circuitry 402 is coupled to the first input of the adder circuitry 406, the second output of the target signal generator circuitry 402 is coupled to the input of the companion signal generator circuitry 404, and the third output of the target signal generator circuitry 402 is coupled to the second input of the filtering circuitry 412. In the example of FIG. 4, the target signal generator circuitry 402 is implemented by one or more special purpose electrical circuits structured to perform specific operation(s) and including one or more semiconductor-based logic devices (e.g., electrical hardware implemented by one or more transistors). In additional or alternative examples, the target signal generator circuitry 402 may be implemented by one or more RF oscillators, one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the target signal generator circuitry 402 may implemented in one or more packages, as part of an SoC, and/or on one or more substrates.

In the illustrated example of FIG. 4, the target signal generator circuitry 402 generates a target signal centered at a center frequency (e.g., $f_c$ Hz) with a bandwidth (e.g., B Hz) specified by the communication protocol with which the target signal generator circuitry 402 is configured and/or designed to operate. For example, when the target signal generator circuitry 402 is configured and/or designed to operate with Bluetooth LE, the target signal generator circuitry 402 generates a target signal having a center frequency at zero Hz (e.g., $f_c$=0 Hz) and a bandwidth on 1.1 MHz (e.g., B=1.1 MHz). After generating the target signal, the target signal generator circuitry 402 transmits the target signal to the adder circuitry 406. Additionally, the target signal generator circuitry 402 transmits the center frequency (e.g., $f_c$ Hz) and the bandwidth (e.g., B Hz) specified by the communication protocol with which the target signal generator circuitry 402 is configured and/or designed to operate with to the companion signal generator circuitry 404 and the filtering circuitry 412.

In the illustrated example of FIG. 4, the first signal generation circuitry 112 includes the companion signal generator circuitry 404. In the example of FIG. 4, the input of the companion signal generator circuitry 404 is coupled to the second output of the target signal generator circuitry 402 and the output of the companion signal generator circuitry 404 is coupled to the second input of the adder circuitry 406. In the example of FIG. 4, the companion signal generator circuitry 404 is implemented by one or more special purpose electrical circuits structured to perform specific operation(s) and including one or more semiconductor-based logic devices (e.g., electrical hardware implemented by one or more transistors). In additional or alternative examples, the companion signal generator circuitry 404 may be implemented by one or more RF oscillators, one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the companion signal generator circuitry 404 may implemented in one or more packages, as part of an SoC, and/or on one or more substrates. In some examples, the target signal generator circuitry 402 and the companion signal generator circuitry 404 are implemented within a hardware device that is programmed and/or configured to generate one or more target signals and one or more companion signals as disclosed herein.

In the illustrated example of FIG. 4, the companion signal generator circuitry 404 generates a companion signal to the target signal generated by the target signal generator circuitry 402. In the example of FIG. 4, the companion signal generator circuitry 404 generates one or more companion signals that have respective center frequencies that satisfy the narrowband threshold and satisfy the distortion threshold. For example, to satisfy the narrowband threshold and the distortion threshold, the companion signal generator circuitry 404 generates one or more companion signals that have respective center frequencies that are shifted from the center frequency (e.g., $f_c$ Hz) of the target signal by less than five times the bandwidth (e.g., 5B Hz) of the target signal but more than one times the bandwidth (e.g., B Hz) of the target signal. As such, for a target signal having a bandwidth of B Hz, the companion signal generator circuitry 404 generates a companion signal that has a center frequency that is shifted from the center frequency, $f_c$, of the target signal by more than B Hz but less than 5B Hz. For example, if the target signal is a Bluetooth LE signal with a center frequency of zero Hz (e.g., $f_c$=0 Hz), the companion signal generator circuitry 404 generates a companion signal that has a center frequency that is shifted from the center frequency (e.g., $f_c=0$ Hz) of the target signal by more than 1.1 MHz but less than 5.5 MHz. After generating the companion signal, the companion signal generator circuitry 404 transmits the companion signal to the adder circuitry 406.

In the illustrated example of FIG. 4, the first input of the adder circuitry 406 is coupled to the first output of the target signal generator circuitry 402, the second input of the adder circuitry 406 is coupled to the output of the companion signal generator circuitry 404, and the output of the adder circuitry 406 is coupled to the input of the transmitter circuitry 408. In the example of FIG. 4, the adder circuitry 406 is implemented by one or more special purpose electrical circuits structured to perform specific operation(s) and including one or more semiconductor-based logic devices (e.g., electrical hardware implemented by one or more transistors). In additional or alternative examples, the adder circuitry 406 may be implemented by one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the adder circuitry 406 may implemented in one or more packages, as part of an SoC, and/or on one or more substrates.

In the illustrated example of FIG. 4, the adder circuitry 406 combines the target signal and the companion signal to form a composite signal. For example, the adder circuitry 406 combines the target signal and the companion signal such that the composite signal that has frequency components of the target signal and the composite signal. For example, if the target signal has a center frequency of 0 MHz (e.g., $f_{c,t}=0$ MHz) and the companion signal has a center frequency of 2.5 MHz (e.g., $f_{c,c}=2.5$ MHz), the adder circuitry 406 generates the composite signal with frequency components at 0 MHz and 2.5 MHz. For example, the adder circuitry 406 adds the companion signal to the target signal to generate the composite signal. After generating the composite signal, the adder circuitry 406 transmits the composite signal to the transmitter circuitry 408.

In the illustrated example of FIG. 4, the input of the transmitter circuitry 408 is coupled to the output of the adder circuitry 406. In the example of FIG. 4, the transmitter circuitry 408 is implemented by one or more special purpose electrical circuits structured to perform specific operation(s) and including one or more semiconductor-based logic devices (e.g., electrical hardware implemented by one or more transistors) such as one or more RF alternating current sources and/or one or more antennas. In additional or alternative examples, the transmitter circuitry 408 may be implemented by one or more antennas, one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the transmitter circuitry 408 may implemented in one or more packages, as part of an SoC, and/or on one or more substrates.

In the illustrated example of FIG. 4, after receiving the composite signal from the adder circuitry 406, the transmitter circuitry 408 transmits the composite signal to a target device (e.g., the second device 104). For example, after receiving the composite signal from the adder circuitry 406, the transmitter circuitry 408 applies the composite signal to a power amplifier before transmitting the signal to the target device. In additional or alternative examples, the transmitter circuitry 408 is implemented as a portion of transceiver circuitry.

Figure 5:
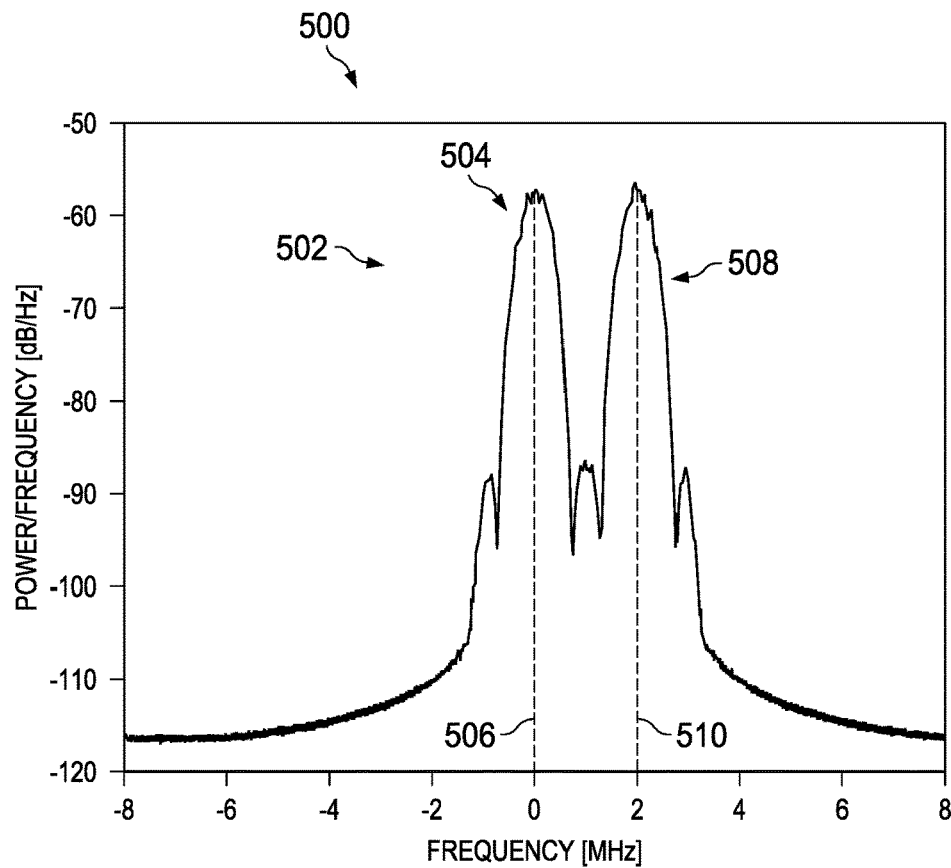
FIG. 5 is a graphical illustration of an example composite signal transmitted by the example transmitter circuitry of FIG. 4.

FIG. 5 is a graphical illustration 500 of an example composite signal 502 transmitted by the example transmitter circuitry 408 of FIG. 4. In the example of FIG. 5, the composite signal 502 is a Bluetooth LE target signal that has been combined with a companion signal to secure communications against early-detect-late-commit attacks. In the example of FIG. 5, the X-axis of the graphical illustration 500 corresponds to frequency and ranges from negative eight MHz to eight MHz (e.g., −8-8 MHz) in intervals of two MHz. In the example of FIG. 5, the Y-axis of the graphical illustration 500 corresponds to the power of the composite signal 502 per frequency and ranges from negative 120 decibels per Hz (db/Hz) to negative fifty db/Hz (e.g., −120-−50 db/Hz) in intervals of 10 db/HZ.

In the illustrated example of FIG. 5, the composite signal 502 includes an example first frequency component 504 representative of the frequency content of the target signal generated by the target signal generator circuitry 402. The first frequency component 504 has an example first center frequency 506 at zero Hz (e.g., $f_{c,t}=0$ Hz). In the example of FIG. 5, the composite signal 502 includes an example second frequency component 508 representative of the frequency content of the companion signal generated by the companion signal generator circuitry 404. The second frequency component 508 has an example second center frequency 510 at two MHz (e.g., $f_{c,c}=2$ MHz).

Returning to FIG. 4, the output of the receiver circuitry 410 is coupled to the first input of the filtering circuitry 412. In the example of FIG. 4, the receiver circuitry 410 is implemented by one or more special purpose electrical circuits structured to perform specific operation(s) and including one or more semiconductor-based logic devices (e.g., electrical hardware implemented by one or more transistors) such as one or more antennas and/or one or more low noise amplifiers. In additional or alternative examples, the receiver circuitry 410 may be implemented by one or more antennas, one or more low noise amplifiers, one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the receiver circuitry 410 may implemented in one or more packages, as part of an SoC, and/or on one or more substrates.

In the illustrated example of FIG. 4, after receiving a composite signal from an originating device (e.g., the second device 104), the receiver circuitry 410 converts the composite signal to an alternating current signal. For example, after receiving the composite signal, the receiver circuitry 410 applies the composite signal to a low noise amplifier before transmitting the signal to the filtering circuitry 412. In additional or alternative examples, the receiver circuitry 410 is implemented as a portion of transceiver circuitry (e.g., transceiver circuitry including the transmitter circuitry 408).

In the illustrated example of FIG. 4, the first input of the filtering circuitry 412 is coupled to the output of the receiver circuitry 410, the second input of the filtering circuitry 412 is coupled to the third output of the target signal generator circuitry 402, and the output of the filtering circuitry 412 is coupled to the input of the signal processing circuitry 414. In the example of FIG. 4, the filtering circuitry 412 is implemented by one or more special purpose electrical circuits structured to perform specific operation(s) and including one or more semiconductor-based logic devices (e.g., electrical hardware implemented by one or more transistors). In additional or alternative examples, the filtering circuitry 412 may be implemented by one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the filtering circuitry 412 may implemented in one or more packages, as part of an SoC, and/or on one or more substrates. In the example of FIG. 2, the filtering circuitry 412 is configured to filter one or more companion signal from one or more composite signals.

In the illustrated example of FIG. 4, the filtering circuitry 412 receives the center frequency (e.g., $f_c$) and the bandwidth (e.g., B) specified by the communication protocol with which the target signal generator circuitry 402 is configured and/or designed to operate with from the target signal generator circuitry 402. Based on the center frequency (e.g., $f_c$) and the bandwidth (e.g., B) specified by the communication protocol, the filtering circuitry 412 adjusts one or more filters of the filtering circuitry 412. After adjusting based on the center frequency (e.g., $f_c$) and the bandwidth (e.g., B) of the target signal, the filtering circuitry 412 implements a narrowband filter having a center frequency at the center frequency (e.g., $f_c$=0 Hz for Bluetooth LE signals) of signals specified by the communication protocol to which the target signal complies and a bandwidth no larger than the bandwidth (e.g., B=1.1 MHz for Bluetooth LE signals) of signals specified by the communication protocol to which the target signal complies. In some examples, the filtering circuitry 412 is implemented by non-adjustable hardware that is designed for a specific communication protocol (e.g., Bluetooth LE). In such examples, the filtering circuitry 412 implements a narrowband filter having a center frequency at the center frequency (e.g., $f_c$=0 Hz for Bluetooth LE signals) of signals specified by the communication protocol to which the target signal complies and a bandwidth no larger than the bandwidth (e.g., B=1.1 MHz for Bluetooth LE signals) of signals specified by the communication protocol to which the target signal complies. As such, the filtering circuitry 412 filters the companion signal from the composite signal to obtain the target signal so that the signal processing circuitry 414 may properly identify a bit sequence of the target signal. In the example of FIG. 4, the filtering circuitry 412 includes a latency that corresponds to the duration of the bits of the bit sequence of the target signal. After filtering the companion signal from the composite signal, the filtering circuitry 412 transmits the target signal to the signal processing circuitry 414.

In the illustrated example of FIG. 4, the input of the signal processing circuitry 414 is coupled to the output of the filtering circuitry 412. In the example of FIG. 4, the signal processing circuitry 414 is implemented by one or more special purpose electrical circuits structured to perform specific operation(s) and including one or more semiconductor-based logic devices (e.g., electrical hardware implemented by one or more transistors). In additional or alternative examples, the signal processing circuitry 414 may be implemented by one or more microprocessors programmed with instructions to perform specific operations, one or more FPGAs that may instantiate instructions to perform specific operations, one or more CPUs programmed with instructions to perform specific operations, one or more GPUs programmed with instructions to perform specific operations, one or more DSPs programmed with instructions to perform specific operations, one or more XPUs programmed with instructions to perform specific operations, one or more microcontrollers programmed with instructions to perform specific operations, and/or one or more integrated circuits such as one or more ASICs. In some examples, the signal processing circuitry 414 may implemented in one or more packages, as part of an SoC, and/or on one or more substrates. In some examples, the signal processing circuitry 414, the target signal generator circuitry 402, and the companion signal generator circuitry 404 are implemented within a hardware device that is programmed and/or configured to generate one or more target signals, to generate one or more companion signals, and to process one or more target signals as disclosed herein.

In the illustrated example of FIG. 4, the signal processing circuitry 414 is configured to process the resulting target signal after the companion signal has been filtered from the composite signal by the filtering circuitry 412. In the example of FIG. 4, the signal processing circuitry 414 performs demodulation to decode bits encoded via GFSK modulation with 250 KHZ deviation. The signal processing circuitry 414 may additionally or alternatively determine the RTT of the target signal.

Figure 6:
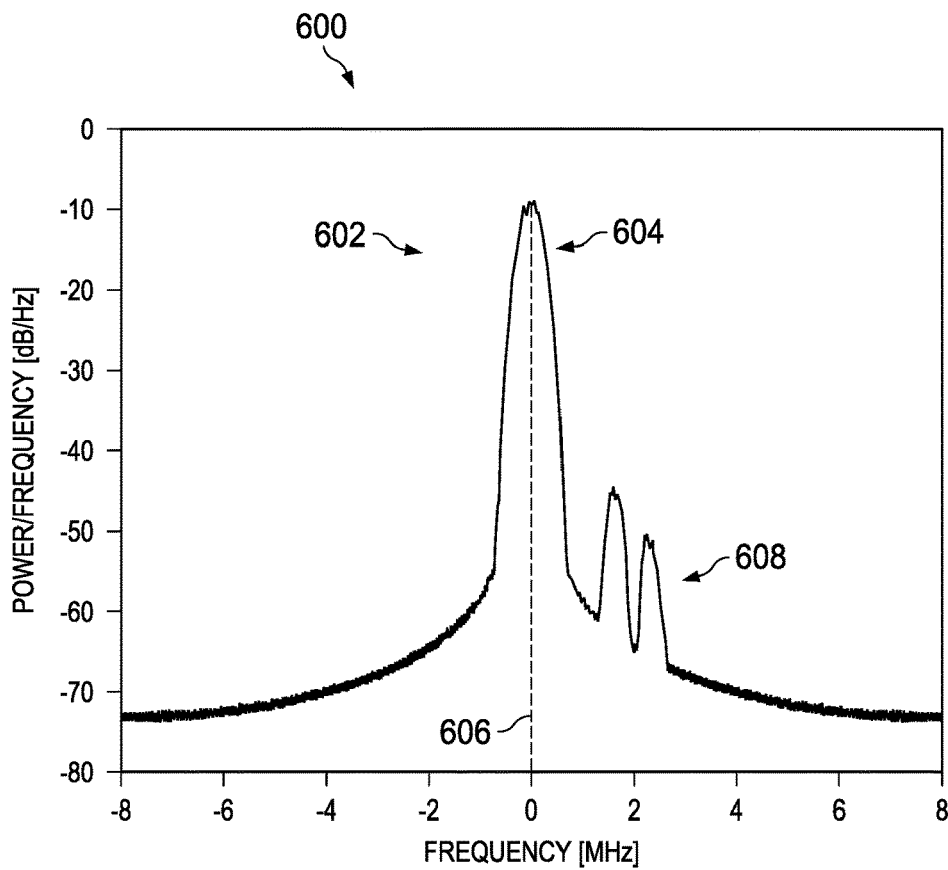
FIG. 6 is a graphical illustration of an example target signal after a companion frequency component has been filtered from the composite signal by the filtering circuitry of FIG. 4.

FIG. 6 is a graphical illustration 600 of an example target signal 602 after a companion frequency component has been filtered from the composite signal by the filtering circuitry 412 of FIG. 4. In the example of FIG. 6, the target signal 602 is a Bluetooth LE target signal. In the example of FIG. 6, the X-axis of the graphical illustration 600 corresponds to frequency and ranges from negative eight MHz to eight MHz (e.g., −8-8 MHz) in intervals of two MHz. In the example of FIG. 6, the Y-axis of the graphical illustration 600 corresponds to the power of the target signal 602 per frequency and ranges from negative 120 db/Hz to negative fifty db/Hz (e.g., −120--50 db/Hz) in intervals of 10 db/HZ.

In the illustrated example of FIG. 6, the target signal 602 includes an example first frequency component 604 representative of the frequency content of the target signal generated by the originating device (e.g., the second device 104). The first frequency component 604 has an example first center frequency 606 at zero Hz (e.g., $f_c$=0 Hz). In the example of FIG. 6, the target signal 602 includes example vestigial frequency components 608 representative of residual frequency content of the companion signal that was not filtered by the filtering circuitry 412. However, because the filtering circuitry 412 implements one or more filters having a latency that corresponds to the duration of the bits of the bit sequence of the target signal, the filtering circuitry 412 advantageously attenuates the vestigial frequency components 608 so that the vestigial frequency components do not interfere with processing by the signal processing circuitry 414.

Figure 7:
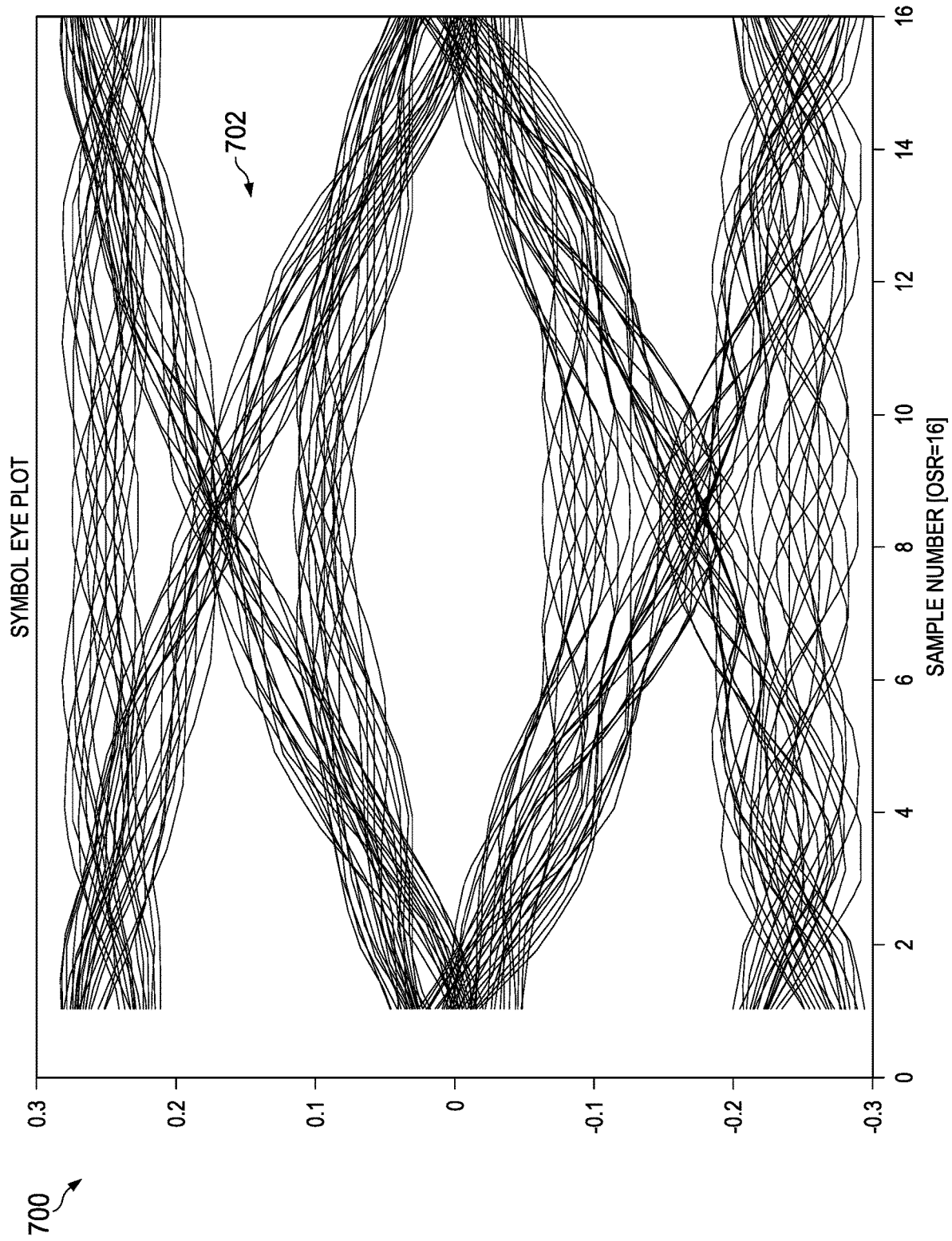
FIG. 7 is a graphical illustration of an example eye plot after a companion frequency component has been filtered from the composite signal by the filtering circuitry of FIG. 4.

FIG. 7 is a graphical illustration 700 of an example eye plot 702 after a companion frequency component has been filtered from the composite signal by the filtering circuitry 412 of FIG. 4. In the example of FIG. 7, the X-axis of the graphical illustration 700 corresponds to sample number and ranges from zero to sixteen (e.g., 0-16) in intervals of two. The example eye plot 702 was generated using an oversampling rate (OSR) filter with a bandwidth sixteen times that of the bandwidth of the target signal (e.g., 16B). In the example of FIG. 7, the Y-axis of the graphical illustration 700 corresponds to the amplitude of the eye plot 702 in millivolts (mV) and ranges from negative 0.3 mV to 0.3 mV (e.g., -0.3-0.3 mV) in intervals of 0.1 mV. In the example of FIG. 7, the filtering circuitry 412 advantageously reduces distortions caused by the presence of the filtered companion signal (e.g., the vestigial frequency components 608). In the example of FIG. 7, the eye plot 702 includes no other form of added noise.

Figure 8:
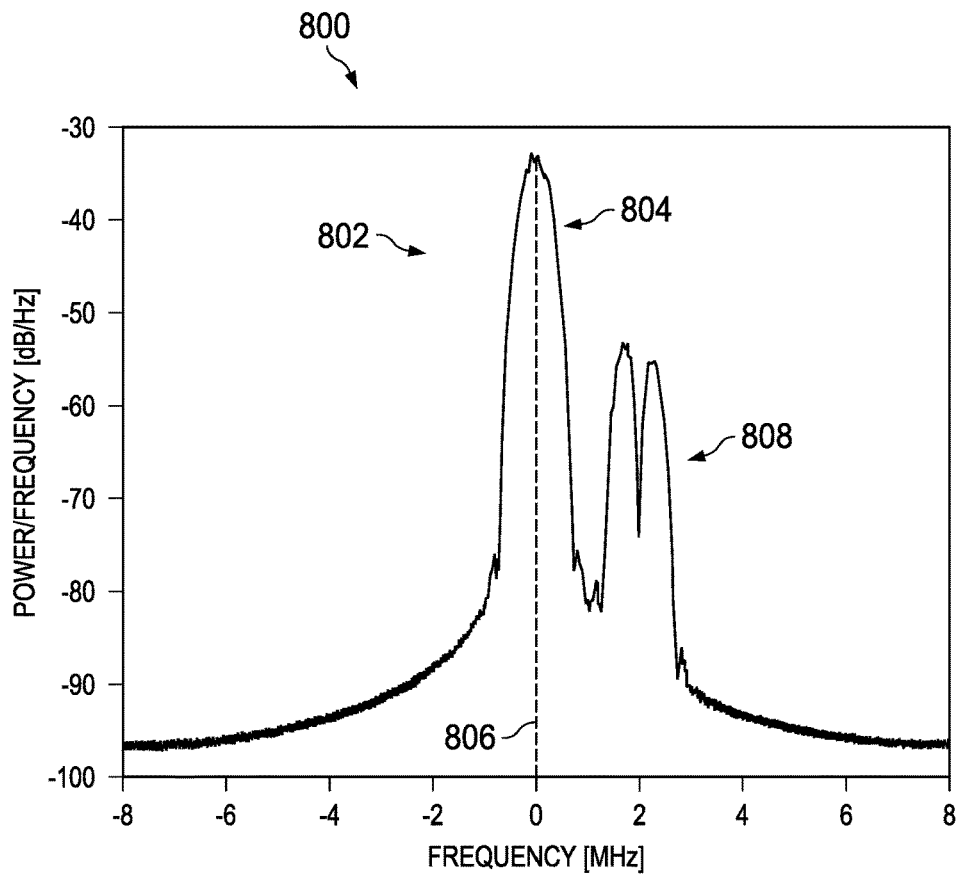
FIG. 8 is a graphical illustration of an example target signal as interpreted by the attack device of FIG. 1.

FIG. 8 is a graphical illustration 800 of an example target signal 802 as processed by the attack device 110 of FIG. 1. In the example of FIG. 8, the target signal 802 is a Bluetooth LE target signal. In the example of FIG. 8, the X-axis of the graphical illustration 800 corresponds to frequency and ranges from negative eight MHz to eight MHZ (e.g., -8-8 MHz) in intervals of two MHz. In the example of FIG. 8, the Y-axis of the graphical illustration 800 corresponds to the power of the target signal 802 per frequency and ranges from negative 100 db/Hz to negative thirty db/Hz (e.g., -100--30 db/Hz) in intervals of 10 db/HZ.

In the illustrated example of FIG. 8, the target signal 802 includes an example first frequency component 804 representative of the frequency content of the target signal generated by the originating device (e.g., the first device 102, the second device 104, etc.). The first frequency component 804 has an example first center frequency 806 at zero Hz (e.g., $f_c$=0 Hz). In the example of FIG. 8, the target signal 802 includes example vestigial frequency components 808 representative of residual frequency content of the companion signal that was not filtered by the filtering circuitry 122. In the example of FIG. 8, the filtering circuitry 122 implements one or more low latency filters that correspond to the inverse of two times the bandwidth of the target signal 802 (e.g., 2B). Even though attack devices will typically implement one or more low latency filters that corresponds to the inverse of at least five times the bandwidth of the target signal 802 (e.g., 1/5B), even with the latency of FIG. 8 (e.g., 2B), interference from the vestigial frequency components 808 is increased (e.g., the amplitude of the vestigial frequency components 808 is larger compared to the amplitude of the vestigial frequency components 608) making it very unlikely (e.g., impossible) for the attack device 110 to discern the content of the target signal 802.

Comparing FIG. 6 to FIG. 8, the lower the latency of the filtering circuitry 122 provides less attenuation than the filtering circuitry 412 will be able to achieve with respect to companion signals. Even if the filtering circuitry 122 achieves a notch at the center frequency of companion signals (e.g., 2 MHz in FIG. 8), the sidelobes of the companion signal frequency content (e.g., the vestigial frequency components 808) are still very large in amplitude, making it very difficult to discern the content of target signals.

Figure 9:
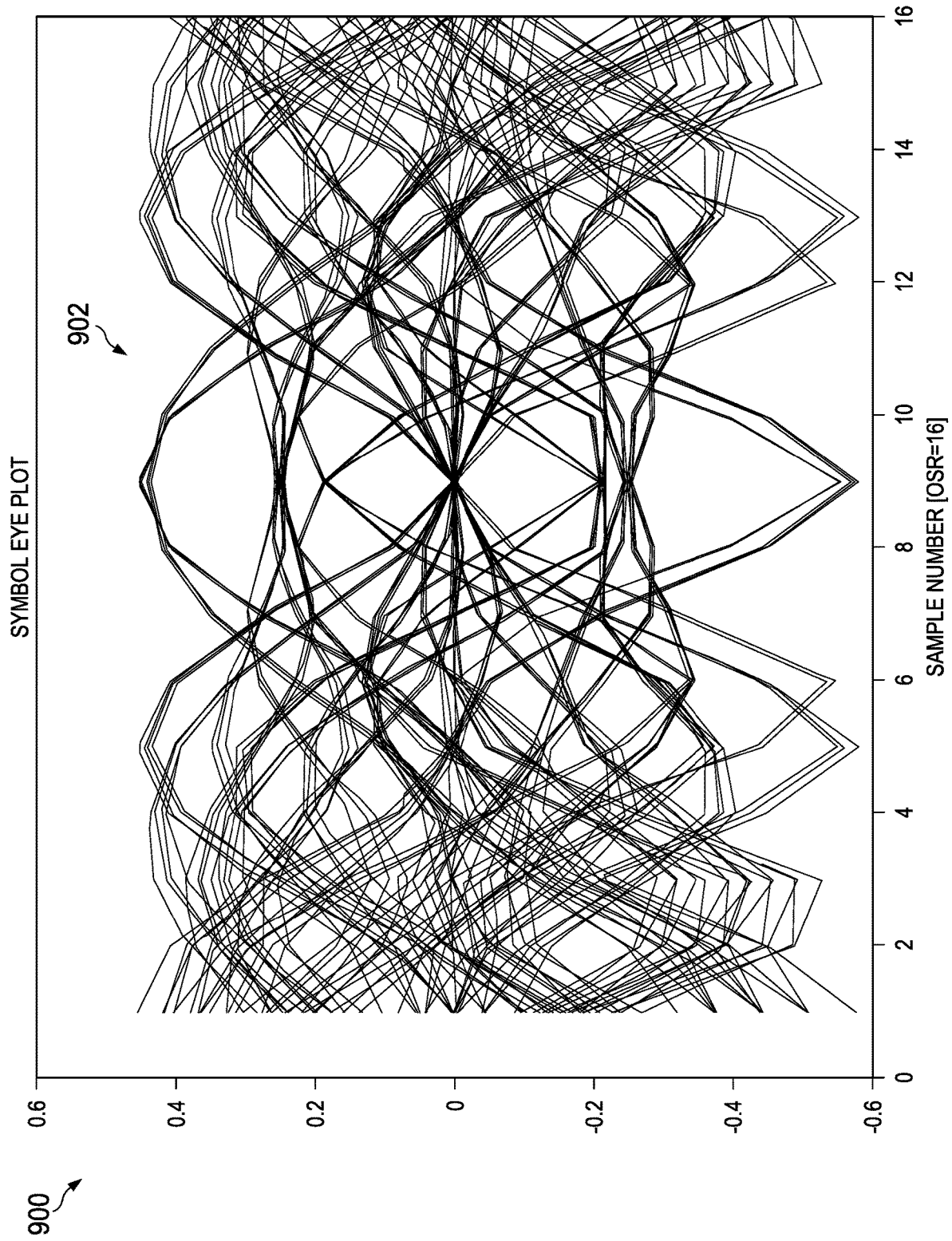
FIG. 9 is a graphical illustration of an example eye plot after a companion frequency component has been filtered from the composite signal by the attack device of FIG. 1.

FIG. 9 is a graphical illustration 900 of an example eye plot 902 after a companion frequency component has been filtered from the composite signal by the attack device 110 of FIG. 1. In the example of FIG. 9, the X-axis of the graphical illustration 900 corresponds to sample number and ranges from zero to sixteen (e.g., 0-16) in intervals of two. The example eye plot 902 was generated using an OSR filter with a bandwidth sixteen times that of the bandwidth of the target signal (e.g., 16B). In the example of FIG. 9, the Y-axis of the graphical illustration 900 corresponds to the amplitude of the eye plot 902 in millivolts (mV) and ranges from negative 0.6 mV to 0.6 mV (e.g., -0.6-0.6 mV) in intervals of 0.2 mV. In the example of FIG. 9, because the filtering circuitry 122 implements low latency, wideband filtering, it is extremely unlikely (e.g., impossible) for the attack device 110 to discern the currently transmitted bit of a target signal and therefore EDLC attacks cannot be performed.

Figure 10:
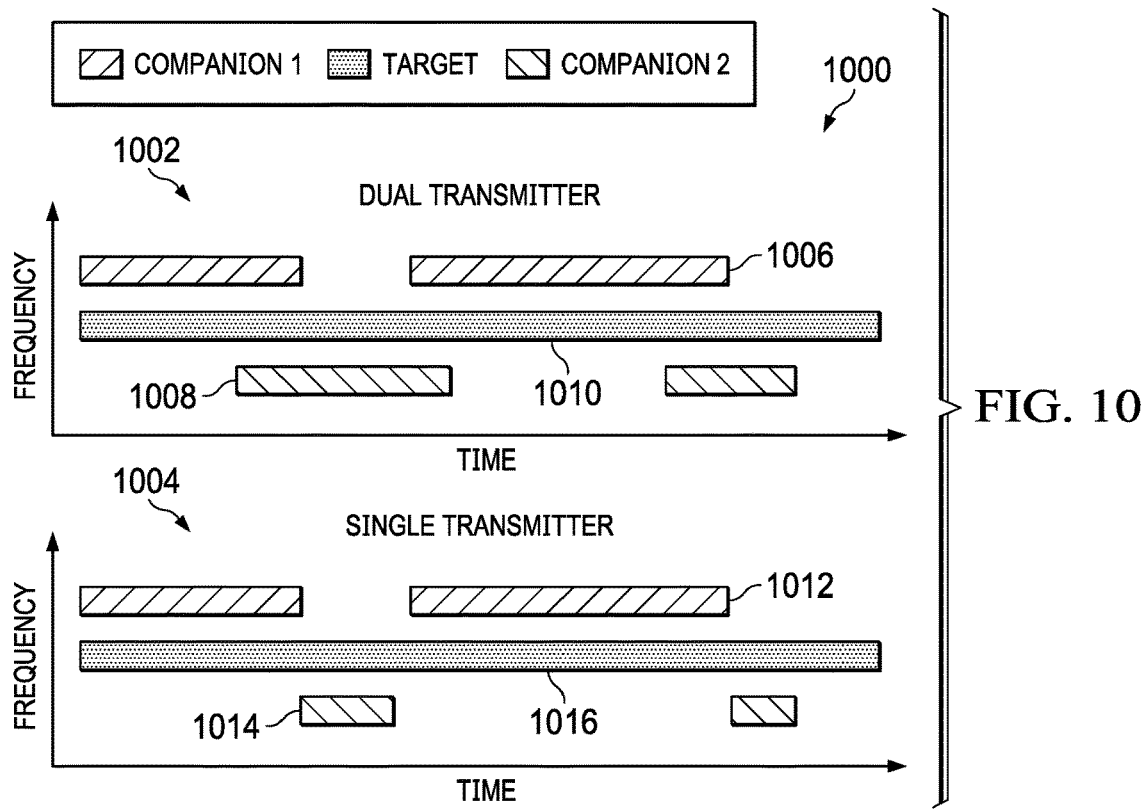
FIG. 10 is a graphical illustration of example implementations of examples disclosed herein.

FIG. 10 is a graphical illustration 1000 of example implementations of examples disclosed herein. For example, the graphical illustration 1000 includes an example first plot 1002 representative of a first implementation and an example second plot 1004 representative of a second implementation. As described above, examples disclosed herein impose no restrictions on the data content of companion signals. As such, companion signals may be unpredictable, varying in position in the frequency spectrum (e.g., positive and/or negative), varying in content (e.g., information encoded in a companion signal), varying in time duration, varying in amplitude over time, and varying in the number of companion signals to a target signal. In the example of FIG. 10, the X-axis of the graphical illustration 1000 corresponds to time. In the example of FIG. 10, the Y-axis of the graphical illustration 1000 corresponds to frequency.

In the illustrated example of FIG. 10, the first plot 1002 represents a first implementation of disclosed methods, apparatus, and articles of manufacture that includes two transmitters (e.g., transmitter circuitry) transmitting an example first companion signal 1006 and an example second companion signal 1008 to an example target signal 1010. In the first plot 1002, the first companion signal 1006 and the second companion signal 1008, in part, overlap in time. As illustrated in the first plot 1002, the first companion signal 1006 has a center frequency that is shifted up in frequency from the center frequency, $f_c$, of the target signal 1010 by more than B Hz but less than 5B Hz. Additionally, as illustrated in the first plot 1002, the second companion signal 1008 has a center frequency that is shifted down in frequency from the center frequency, $f_c$, of the target signal 1010 by more than B Hz but less than 5B Hz.

In the illustrated example of FIG. 10, the second plot 1004 represents a second implementation of disclosed methods, apparatus, and articles of manufacture that includes one transmitter (e.g., transmitter circuitry) transmitting an example first companion signal 1012 and an example second companion signal 1014 to an example target signal 1016. In the second plot 1004, the first companion signal 1012 and the second companion signal 1014 do not overlap in time as the individual transmitter circuitry alternates between transmitting the first companion signal 1012 and the second companion signal 1014. As illustrated in the second plot 1004, the first companion signal 1012 has a center frequency that is shifted up in frequency from the center frequency, $f_c$, of the target signal 1016 by more than B Hz but less than 5B Hz. Additionally, as illustrated in the second plot 1004, the second companion signal 1014 has a center frequency that is shifted down in frequency from the center frequency, $f_c$, of the target signal 1016 by more than B Hz but less than 5B Hz.

While an example manner of implementing the first signal generation circuitry 112 and/or the first signal evaluation circuitry 114 of FIG. 1 is illustrated in FIG. 4, one or more of the elements, processes, and/or devices illustrated in FIG. 4 may be combined, divided, re-arranged, omitted, eliminated, and/or implemented in any other way. Further, the example target signal generator circuitry 402, the example companion signal generator circuitry 404, the example adder circuitry 406, the example transmitter circuitry 408, and/or, more generally, the example first signal generation circuitry 112 of FIG. 4, and/or the example receiver circuitry 410, the example filtering circuitry 412, the example signal processing circuitry 414, and/or, more generally, the example first signal evaluation circuitry 114 may be implemented by hardware, software, firmware, and/or any combination of hardware, software, and/or firmware. Thus, for example, any of the example target signal generator circuitry 402, the example companion signal generator circuitry 404, the example adder circuitry 406, the example transmitter circuitry 408, and/or, more generally, the example first signal generation circuitry 112 of FIG. 4, and/or the example receiver circuitry 410, the example filtering circuitry 412, the example signal processing circuitry 414, and/or, more generally, the example first signal evaluation circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example target signal generator circuitry 402, the example companion signal generator circuitry 404, the example adder circuitry 406, the example transmitter circuitry 408, and/or, more generally, the example first signal generation circuitry 112 of FIG. 4, and/or the example receiver circuitry 410, the example filtering circuitry 412, the example signal processing circuitry 414, and/or, more generally, the example first signal evaluation circuitry 114 is/are hereby expressly defined to include a non-transitory computer readable storage device or storage disk such as a memory, a digital versatile disk (DVD), a compact disk (CD), a Blu-ray disk, etc., including the software and/or firmware. Further still, the example first signal generation circuitry 112 and/or the example first signal evaluation circuitry 114 of FIG. 4 may include one or more elements, processes, and/or devices in addition to, or instead of, those illustrated in FIG. 4, and/or may include more than one of any or all of the illustrated elements, processes and devices.

Figure 12:
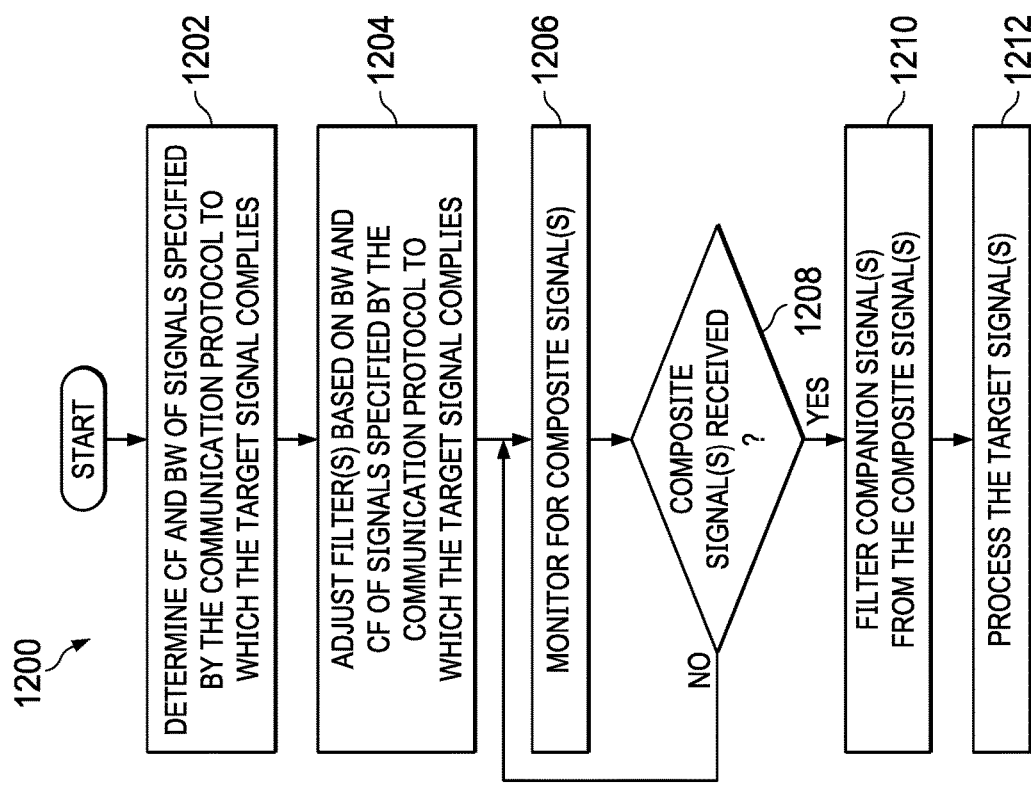
FIG. 12 is a flowchart representative of an example process that may be performed using machine readable instructions that can be executed and/or hardware configured to implement the first signal evaluation circuitry of FIG. 1 to process communications that have been secured against early-detect-late-commit attacks.
Figure 11:
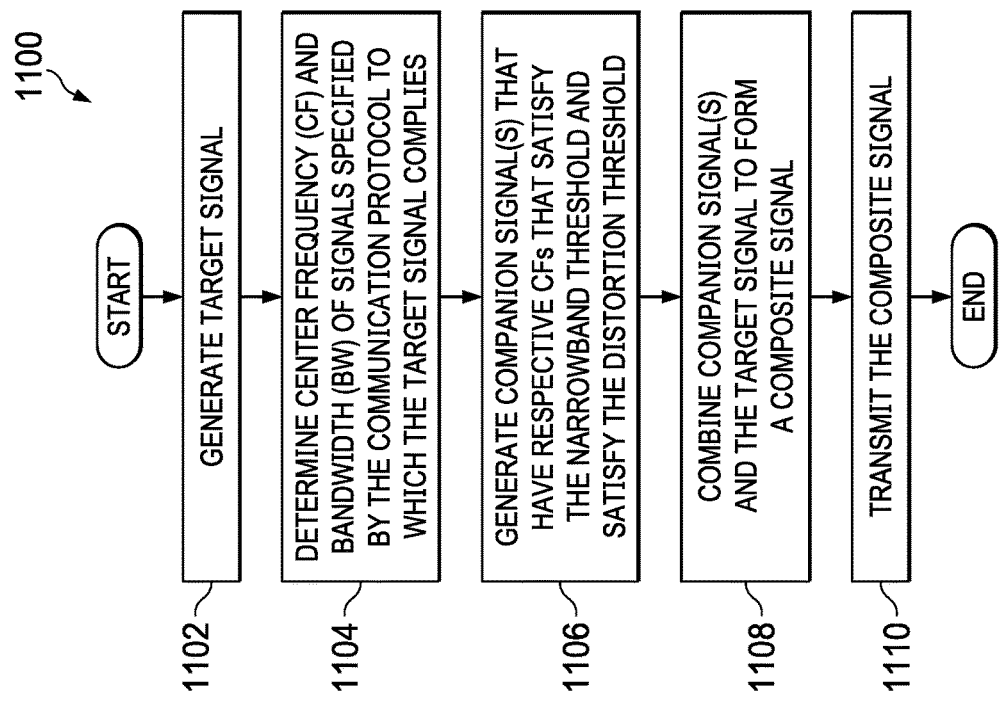
FIG. 11 is a flowchart representative of an example process that may be performed using machine readable instructions that can be executed and/or hardware configured to implement the first signal generation circuitry of FIG. 1 to secure communications against early-detect-late-commit attacks.

A flowchart representative of example hardware logic circuitry, machine readable instructions, hardware implemented state machines, and/or any combination thereof for implementing the first signal generation circuitry 112 of FIGS. 1 and/or 4 is shown in FIG. 11. A flowchart representative of example hardware logic circuitry, machine readable instructions, hardware implemented state machines, and/or any combination thereof for implementing the first signal evaluation circuitry 114 of FIGS. 1 and/or 4 is shown in FIG. 12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowchart illustrated in FIG. 11 and the flowchart illustrated in FIG. 12, many other methods of implementing the example first signal generation circuitry 112 and the first signal evaluation circuitry 114 may alternatively be used, respectively. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 11 and/or 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be part of different examples or claims, these may possibly be combined, and the inclusion in different examples or claims does not imply that a combination of features is not feasible and/or advantageous.

FIG. 11 is a flowchart representative of an example process 1100 that may be performed using machine readable instructions that can be executed and/or hardware configured to implement the first signal generation circuitry 112 of FIG. 1 to secure communications against EDLC attacks. In the example of FIG. 11, the process 1100 begins at block 1102 where the target signal generator circuitry 402 generates a target signal. After block 1102, the target signal generator circuitry 402 transmits the target signal to the adder circuitry 406.

In the illustrated example of FIG. 11, at block 1104 the companion signal generator circuitry 404 determines the center frequency (e.g., $f_c$ Hz) and bandwidth (e.g., B Hz) of signals specified by the communication protocol to which the target signal complies based on information received from the target signal generator circuitry 402. For example, after block 1102, the target signal generator circuitry 402 transmits the center frequency (e.g., $f_c$ Hz) and the bandwidth (e.g., B Hz) of signals specified by the communication protocol to which the target signal complies to the companion signal generator circuitry 404 and the filtering circuitry 412. At block 1106 the companion signal generator circuitry 404 generates one or more companion signals that have respective center frequencies that satisfy the narrowband threshold and satisfy the distortion threshold. For example, at block 1106, to satisfy the narrowband threshold and the distortion threshold, the companion signal generator circuitry 404 generates one or more companion signals that have respective center frequencies less than five times the bandwidth of the target signal away from the center frequency of the target signal, but more than one times the bandwidth of the target signal away from the center frequency of the target signal.

In the illustrated example of FIG. 11, by implementing the narrowband threshold at block 1106, the companion signal generator circuitry 404 ensures that companion signals are close enough in frequency to target signals to force attack devices (e.g., the attack device 110) to implement narrowband filtering circuitry to differentiate between the target signals and the companion signals. Advantageously, reducing the bandwidth of the filtering circuitry increases the latency associated therewith and prevents attack devices (e.g., the attack device 110) from detecting the contents of target signals early enough to perform effective EDLC attacks. Even assuming an attack device (e.g., the attack device 110) includes infinite computing capability, the attack device would still be unable to perform an effective EDLC attack without implementing narrowband filtering. Yet, the attack device cannot perform effective EDLC attacks with narrowband filtering because only wideband filtering allows the attack device to perform an EDLC attack early enough (e.g., due to the inherent latency of the filtering) to be feasible. Additionally, by implementing the distortion threshold at block 1106, the companion signal generator circuitry 404 advantageously ensures that companion signals are far enough in frequency from target signals to allow a target device to recover the target signal without errors. After block 1106, the companion signal generator circuitry 404 transmits the one or more companion signals to the adder circuitry 406.

In the illustrated example of FIG. 11, at block 1108, the adder circuitry 406 combines the target signal and the one or more companion signals to form a composite signal. For example, the adder circuitry 406 combines the target signal and the one or more companion signals such that the composite signal has frequency components of the target signal and the one or more composite signals. At block 1110 the transmitter circuitry 408 transmits the composite signal to a target device (e.g., the second device 104). After block 1110, the process 1100 terminates.

FIG. 12 is a flowchart representative of an example process 1200 that may be performed using machine readable instructions that can be executed and/or hardware configured to implement the first signal evaluation circuitry 114 of FIG. 1 to process communications that have been secured against EDLC attacks. In the example of FIG. 12, the process 1200 begins at block 1202 where the filtering circuitry 412 determines the center frequency and bandwidth of signals specified by the communication protocol to which the target signal complies. For example, at block 1202, the filtering circuitry 412 determines the center frequency (e.g., $f_c$ Hz) and bandwidth (e.g., B Hz) of signals specified by the communication protocol to which the target signal complies based on information received from the target signal generator circuitry 402. For example, after block 1102 of the process 1100, the target signal generator circuitry 402 transmits the center frequency (e.g., $f_c$ Hz) and the bandwidth (e.g., B Hz) of signal specified by the communication protocol to which the target signal complies to the filtering circuitry 412.

In the illustrated example of FIG. 12, at block 1204, the filtering circuitry 412 adjusts one or more filters based on the bandwidth and center frequency of signals specified by the communication protocol to which the target signal complies. In some examples, the filtering circuitry 412 is implemented by non-adjustable hardware that is designed for a specific communication protocol (e.g., Bluetooth LE). In such examples, block 1202 and block 1204 of the process 1200 may be omitted.

In the illustrated example of FIG. 12, at block 1206 the receiver circuitry 410 monitors for one or more composite signals. At block 1208, the receiver circuitry 410 determines whether one or more composite signals have been received. In response to the receiver circuitry 410 determining that one or more composite signals have been received (block 1208: YES), the process 1200 proceeds to block 1210. In response to the receiver circuitry 410 determining that one or more composite signals have not been received (block 1208: NO), the process 1200 returns to block 1208.

In the illustrated example of FIG. 12, at block 1210, the filtering circuitry 412 filters one or more companion signals from the one or more composite signals. After block 1210, the filtering circuitry 412 transmits one or more target signals to the signal processing circuitry 414. At block 1212, the signal processing circuitry 414 processes the one or more target signals after the one or more companion signals have been filtered from the one or more composite signals by the filtering circuitry 412. For example, the signal processing circuitry 414 performs demodulation to decode bits encoded via GFSK modulation with 250 KHZ deviation. In some examples, the signal processing circuitry 414 determines one or more RTTs of the one or more target signals. After block 1212, the process 1200 terminates.

Figure 13:
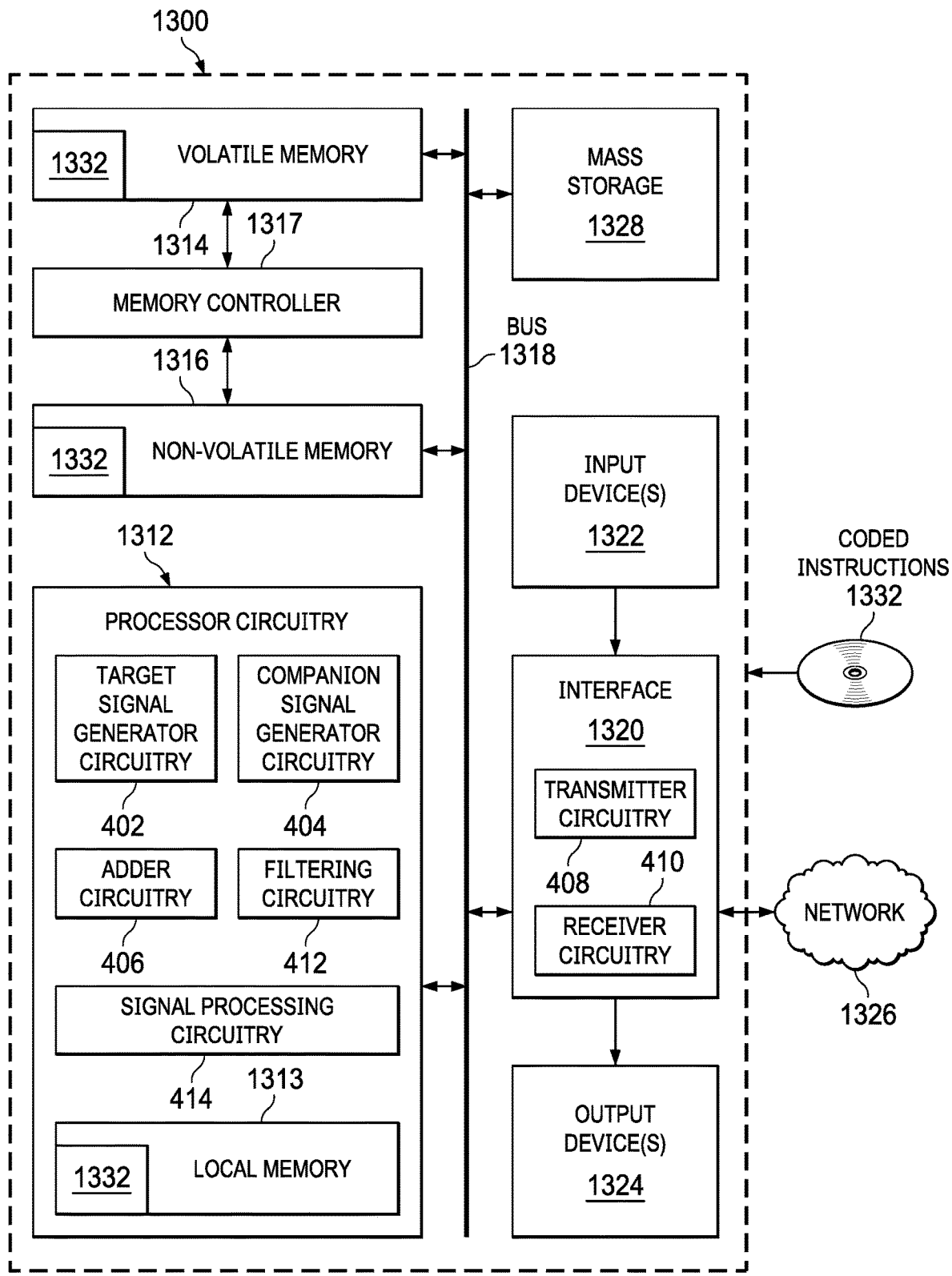
FIG. 13 is a schematic diagram of an example processing platform including processor circuitry structured to execute the example process of FIG. 11 to implement the first signal generation circuitry of FIG. 1 and/or the process of FIG. 12 to implement the first signal evaluation circuitry of FIG. 1.

FIG. 13 is a schematic diagram of an example processing platform including processor circuitry structured to execute the example process of FIG. 11 to implement the first signal generation circuitry of FIG. 1 and/or the process of FIG. 12 to implement the first signal evaluation circuitry of FIG. 1.

FIG. 13 is a schematic diagram of an example processor platform 1300 structured to execute and/or instantiate the processes of FIGS. 11 and/or 12 to implement the first signal generation circuitry 112 and/or the first signal evaluation circuitry 114 of FIGS. 1 and/or 4, respectively. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example target signal generator circuitry 402, the example companion signal generator circuitry 404, the example adder circuitry 406, the example filtering circuitry 412, and the example signal processing circuitry 414.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuitry 1320 implements the example transmitter circuitry 408 and the example receiver circuitry 410.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the process 1100 of FIG. 11 and/or the process 1200 of FIG. 12, may be stored in the mass storage device 1328, in the volatile memory 1314, in the non-volatile memory 1316, and/or on a removable non-transitory computer readable storage medium such as a CD or DVD.

Figure 14:
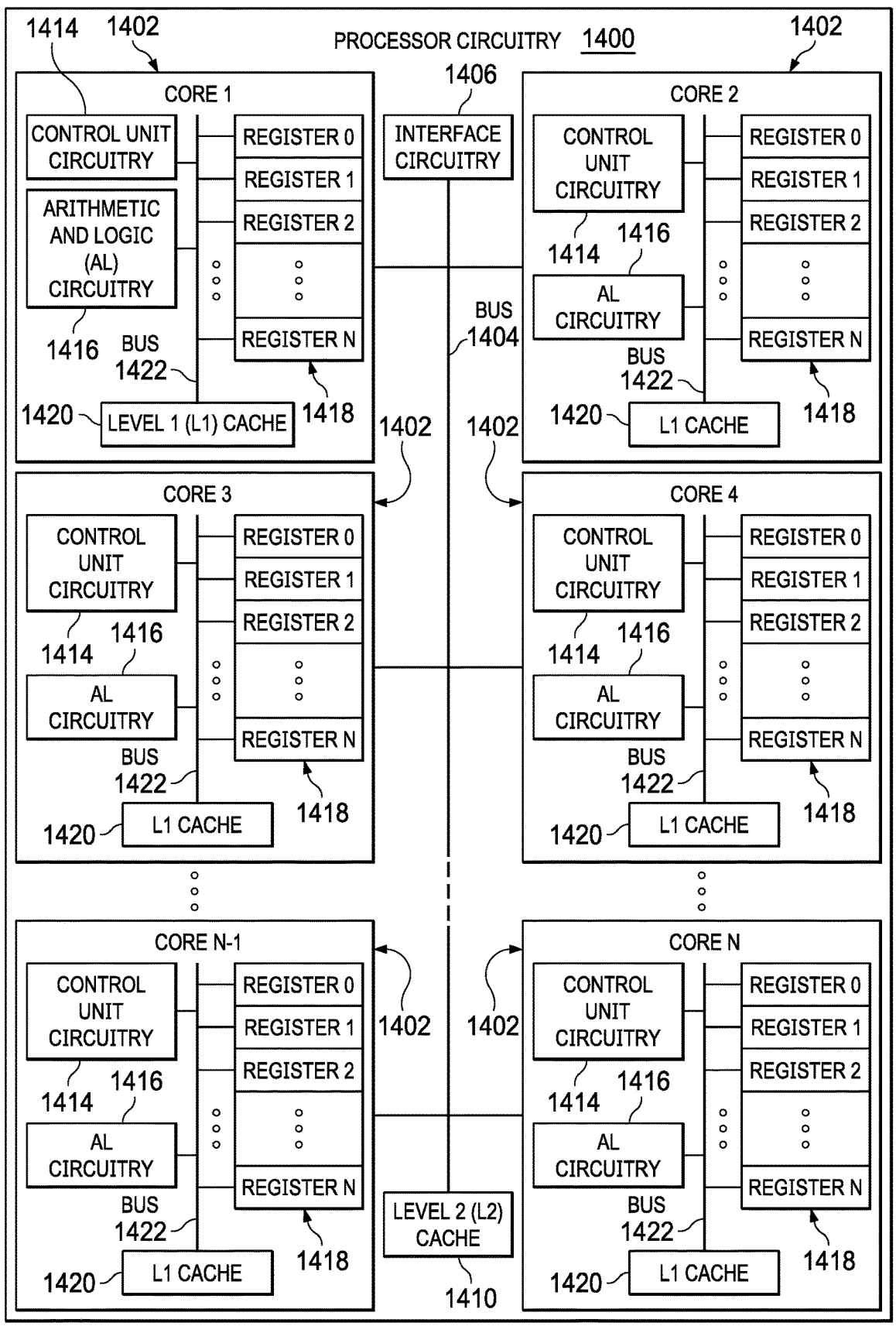
FIG. 14 is a schematic diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowchart of FIG. 11 and/or the flowchart of FIG. 12.

The cores 1402 may communicate by an example first bus 1404. In some examples, the first bus 1404 may implement a communication bus to achieve communication associated with one(s) of the cores 1402. For example, the first bus 1404 may implement at least one of an Inter-Integrated Circuit (I2C) bus, a Serial Peripheral Interface (SPI) bus, a PCI bus, or a PCIe bus. Additionally or alternatively, the first bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and an example second bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
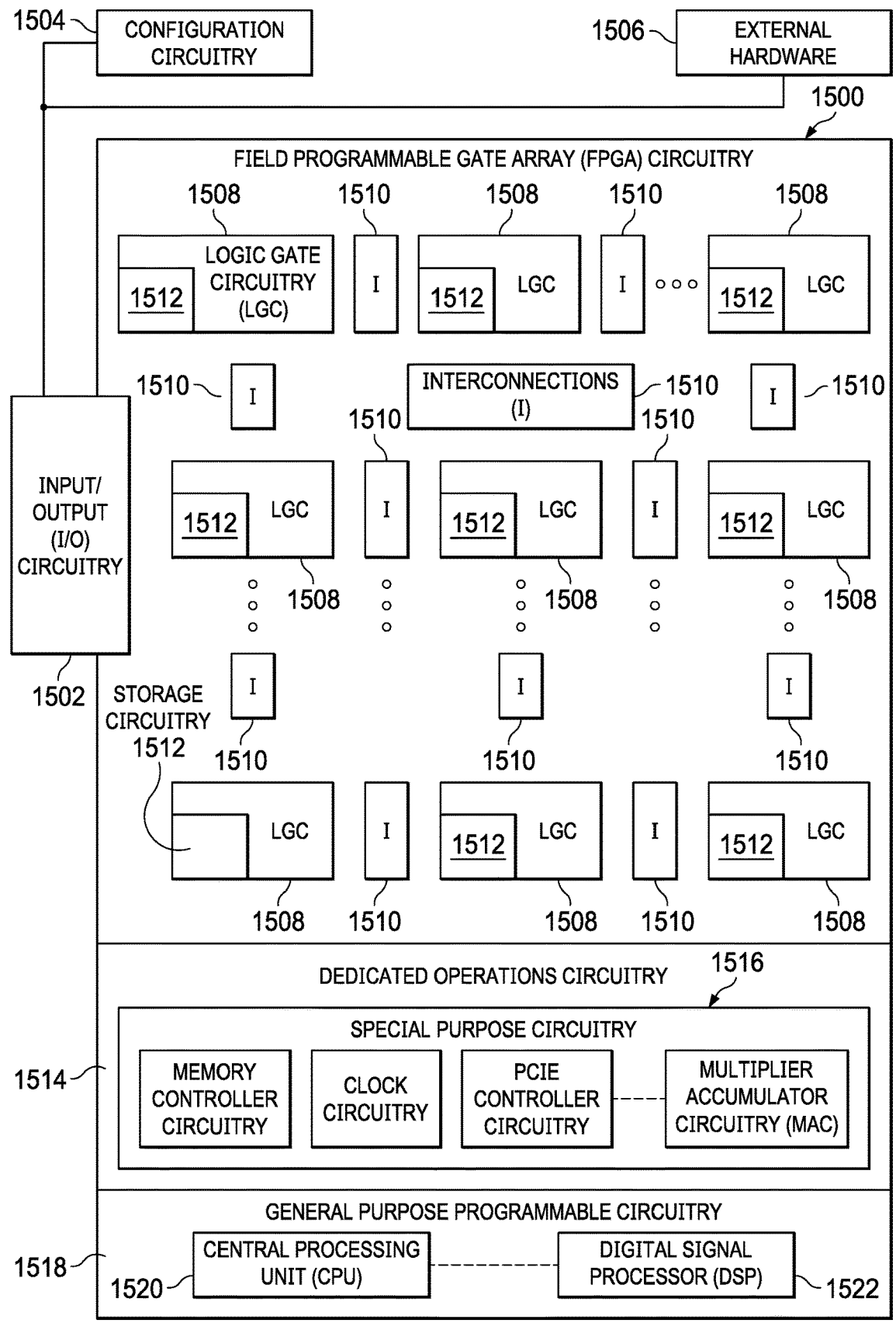
FIG. 15 is a schematic diagram of another example implementation of the processor circuitry of FIG. 13.

FIG. 15 is a schematic diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowchart of FIG. 11 and/or the flowchart of FIG. 12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowchart of FIG. 11 and/or the flowchart of FIG. 12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowchart of FIG. 11 and/or the flowchart of FIG. 12. As such, the FPGA circuitry 1500 may be structured to effectively instantiate some or all of the machine readable instructions of the flowchart of FIG. 11 and/or the flowchart of FIG. 12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 11 and/or FIG. 12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIG. 11 and/or FIG. 12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowchart of FIG. 11 and/or the flowchart of FIG. 12 may be executed by one or more of the cores 1402 of FIG. 14 and a second portion of the machine readable instructions represented by the flowchart of FIG. 11 and/or FIG. 12 may be executed by the FPGA circuitry 1500 of FIG. 15.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
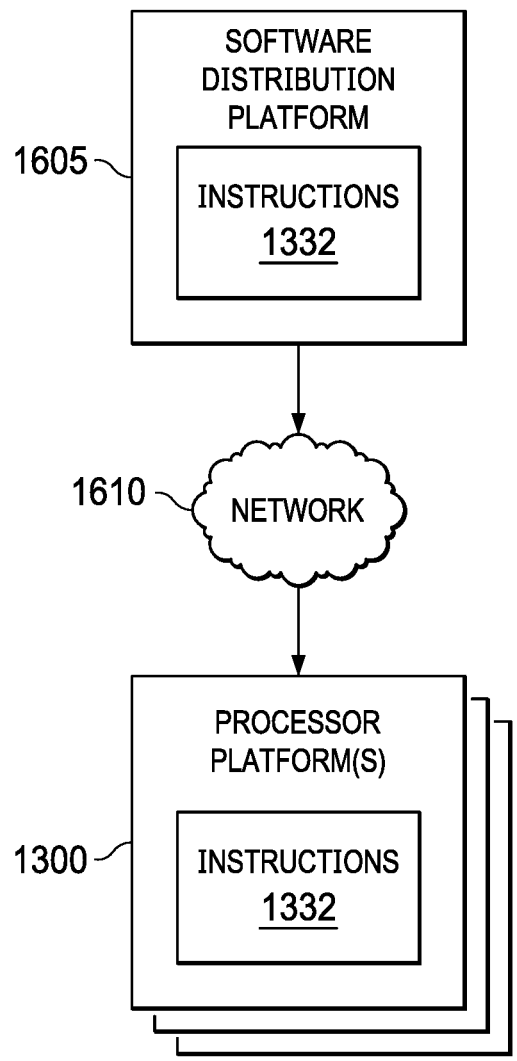
FIG. 16 is a schematic diagram of an example software distribution platform (e.g., one or more servers) to distribute software (e.g., software corresponding to the example machine readable instructions such as those that implement the processes of FIGS. 11 and/or 12) to client devices of end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example process 1100 of FIG. 11 and/or the example process 1200 of FIG. 12, as described above. The one or more servers of the example software distribution platform 1605 are in communication with a network 1610, which may correspond to any one or more of the Internet and/or any other network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example process 1100 of FIG. 11 and/or the process 1200 of FIG. 12, may be downloaded to the example processor platform 1300, which is to execute the machine readable instructions 1332 to implement the first signal generation circuitry 112 and/or the first signal evaluation circuitry 114. In some example, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

Example methods, apparatus and articles of manufacture described herein improve communication security by reducing (e.g., eliminating) the possibility of EDLC attacks. Many industries may benefit from examples disclosed herein. For example, when implementing disclosed methods, apparatus, and articles of manufacture, it is very unlikely (e.g., impossible) that measurements of RTT may be tampered via an EDLC attack. In other words, example methods, apparatus, and articles of manufacture disclosed herein are virtually immune to EDLC attacks. As such, disclosed methods, apparatus, and articles of manufacture may be said to prevent tampering with RTT measurements by construction.

Modifications are possible in the described embodiments, and other embodiments are possible, within the scope of the claims.

What is claimed is:

1. An apparatus to prevent early-detect-late-commit attacks, the apparatus comprising:
    target signal generator circuitry configured to generate a target signal having a first center frequency and a bandwidth;
    companion signal generator circuitry coupled to the target signal generator circuitry, the companion signal generator circuitry configured to generate a companion signal having a second center frequency that is less than (a) the first center frequency adjusted by a first threshold and greater than (b) the first center frequency adjusted by a second threshold, the first threshold being a first multiple of the bandwidth, the second threshold being a second multiple of the bandwidth, the first multiple different than the second multiple;
    adder circuitry coupled to the target signal generator circuitry and the companion signal generator circuitry, the adder circuitry configured to combine the target signal and the companion signal to form a composite signal; and
    transmitter circuitry coupled to the adder circuitry, the transmitter circuitry configured to transmit the composite signal to a target device.

2. The apparatus of claim 1, wherein:
    the first threshold is a first frequency value that is approximately five times the bandwidth; and
    the second threshold is a second frequency value that is approximately one times the bandwidth.

3. The apparatus of claim 1, wherein the composite signal includes frequency components at the first center frequency and the second center frequency.

4. The apparatus of claim 1, wherein a difference between the first center frequency and the second center frequency is approximately an absolute value of two times the bandwidth.

5. The apparatus of claim 4, wherein the companion signal has similar power to the target signal.

6. The apparatus of claim 1, wherein the target signal corresponds to a round trip time measurement.

7. The apparatus of claim 1, wherein the companion signal is a first companion signal of a plurality of companion signals, the companion signal generator circuitry is first companion signal generator circuitry, and:

the apparatus further includes second companion signal generator circuitry coupled to the target signal generator circuitry, the second companion signal generator circuitry configured to generate a second companion signal of the plurality of companion signals, the second companion signal having a third center frequency that is greater than (a) the first center frequency adjusted by the first threshold and less than (b) the first center frequency adjusted by the second threshold;

the adder circuitry is coupled to the second companion signal generator circuitry, the adder circuitry configured to combine the target signal, the first companion signal, the second companion signal, and other ones of the plurality of companion signals to form the composite signal; and the transmitter circuitry is configured to transmit the composite signal to the target device.

8. The apparatus of claim 1, wherein the target device is included in a communication system implemented for at least one of proximity sensing, one or more real-time location systems, one or more personal security applications for prevention of theft and/or loss of devices, one or more digital keys, radar, or data transfer.

9. An apparatus to prevent early-detect-late-commit attacks, the apparatus comprising:

receiver circuitry configured to obtain a composite signal including a target signal and one or more companion signals, the target signal having a first center frequency and a first bandwidth;

filtering circuitry coupled to the receiver circuitry, the filtering circuitry configured to filter the one or more companion signals from the composite signal via a filter having a second center frequency approximately equal to the first center frequency and a second bandwidth less than or equal to the first bandwidth; and signal processing circuitry coupled to the filtering circuitry, the signal processing circuitry configured to process the target signal to decode one or more bits of a bit sequence of the target signal.

10. The apparatus of claim 9, wherein the filtering circuitry includes a latency that corresponds to a duration of the one or more bits of the bit sequence of the target signal.

11. The apparatus of claim 9, wherein the filter is a narrowband filter.

12. The apparatus of claim 9, wherein the filtering circuitry is configured to:

determine a third center frequency and a third bandwidth of one or more signals of a communication protocol with which the apparatus is configured to operate, the third center frequency approximately equal to the first center frequency, the third bandwidth approximately equal to the first bandwidth; and adjust (a) the second center frequency of the filter based on the third center frequency and (b) the second bandwidth based on the third bandwidth.

13. A method for preventing early-detect-late-commit attacks, the method comprising:

generating a target signal having a first center frequency and a bandwidth;

generating a companion signal having a second center frequency that is less than (a) the first center frequency adjusted by a first threshold and greater than (b) the first center frequency adjusted by a second threshold, the first threshold being a first multiple of the bandwidth, the second threshold being a second multiple of the bandwidth, the first multiple different than the second multiple;

combining the target signal and the companion signal to form a composite signal; and transmitting the composite signal to a target device.

14. The method of claim 13, wherein:

the first threshold is a first frequency value that is approximately five times the bandwidth; and the second threshold is a second frequency value that is approximately one times the bandwidth.

15. The method of claim 13, wherein the composite signal includes frequency components at the first center frequency and the second center frequency.

16. The method of claim 13, wherein a difference between the first center frequency and the second center frequency is approximately an absolute value of two times the bandwidth.

17. The method of claim 16, wherein the companion signal has similar power to the target signal.

18. The method of claim 13, wherein the target signal corresponds to a round trip time measurement.

19. The method of claim 13, wherein the companion signal is a first companion signal of a plurality of companion signals and the method further includes:

generating a second companion signal of the plurality of companion signals, the second companion signal having a third center frequency that is greater than (a) the first center frequency adjusted by the first threshold and less than (b) the first center frequency adjusted by the second threshold;

combining the target signal, the first companion signal, the second companion signal, and other ones of the plurality of companion signals to form the composite signal; and transmitting the composite signal to the target device.

20. The method of claim 13, wherein the target device is included in a communication system implemented for at least one of proximity sensing, one or more real-time location systems, one or more personal security applications for prevention of theft and/or loss of devices, one or more digital keys, radar, or data transfer.

* * * * *